US006413616B1

(12) United States Patent
Mizuno

(10) Patent No.: US 6,413,616 B1
(45) Date of Patent: Jul. 2, 2002

(54) BUILDING BOARD AND METHOD AND APPARATUS FOR COATING BUILDING BOARD

(75) Inventor: Daizo Mizuno, Nagoya (JP)

(73) Assignee: Nichiha Corporation, Nagoya (JP)

( * ) Notice: Subject to any disclaimer, the term of this patent is extended or adjusted under 35 U.S.C. 154(b) by 0 days.

(21) Appl. No.: 09/015,218

(22) Filed: Jan. 29, 1998

(30) Foreign Application Priority Data

Jun. 30, 1997 (JP) ........................................... 9-174912

(51) Int. Cl.[7] .............................. B32B 3/28; E04F 13/00

(52) U.S. Cl. ....................... 428/167; 428/168; 428/207; 428/542.2; 52/311.1

(58) Field of Search ................................ 428/207, 204, 428/168, 164, 201, 167, 542.2; 52/311.1

(56) References Cited

U.S. PATENT DOCUMENTS 5,232,764 A * 8/1993 Oshima ...................... 428/173
5,654,552 A * 8/1997 Toombs ................... 250/462.1
5,662,968 A 9/1997 Yamaguchi

FOREIGN PATENT DOCUMENTS

JP 3-238063 A 10/1991
JP 07039809 * 2/1995
JP 08108128 A 4/1996

* cited by examiner

*Primary Examiner*—Donald J. Loney

(57) ABSTRACT

An aesthetically enhanced building board is disclosed which is obtained by applying an effective shade coating to concavities of a building board having linear, curved, continuous or discontinuous concavities or any other concavities. In accordance with a cross-sectional geometry in crosswise direction of a groove 5 formed in a surface of a building board (A), level (hs), position (m), and jetting angle ($\alpha$) are controlled, thereby a coating is applied in such a manner that color of the coating is deepest in a bottom of the groove 5 and, in sides, it becomes lighter from the bottom to the surface.

7 Claims, 32 Drawing Sheets

FIG.1 ( A )
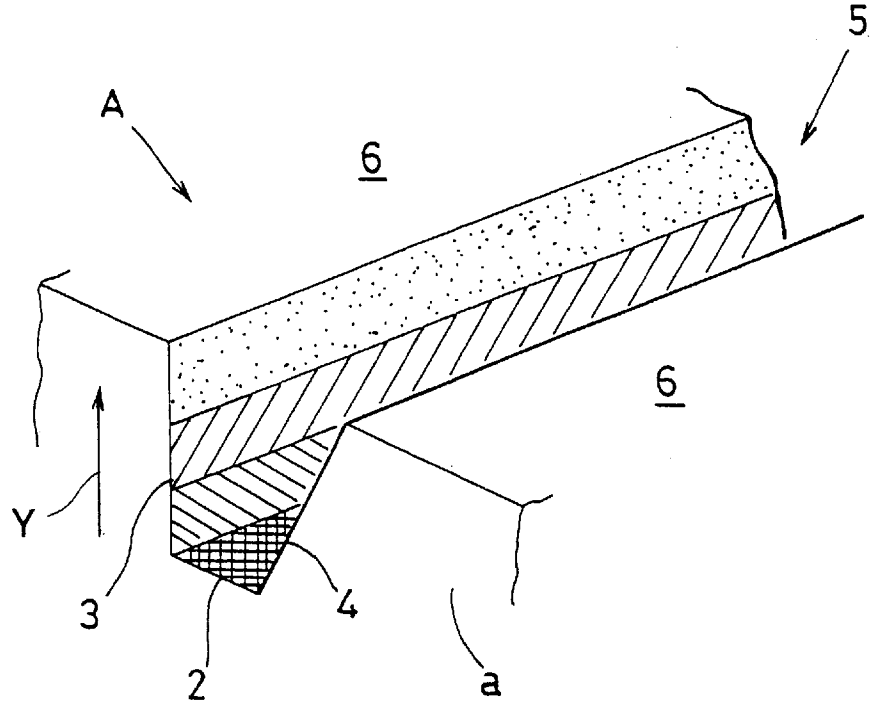
FIG.1 ( B )
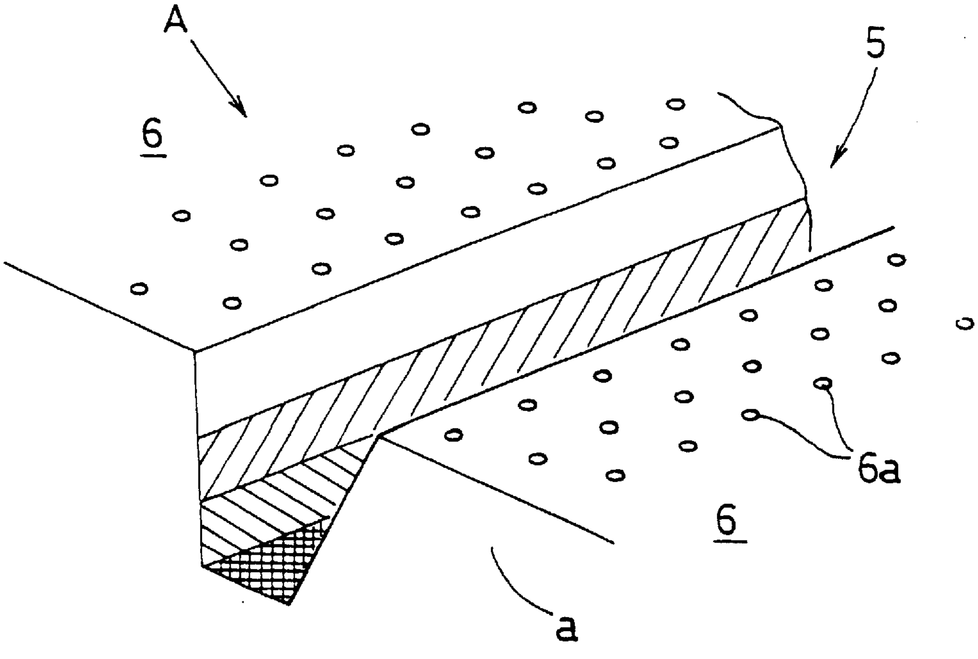

FIG.2 ( A )
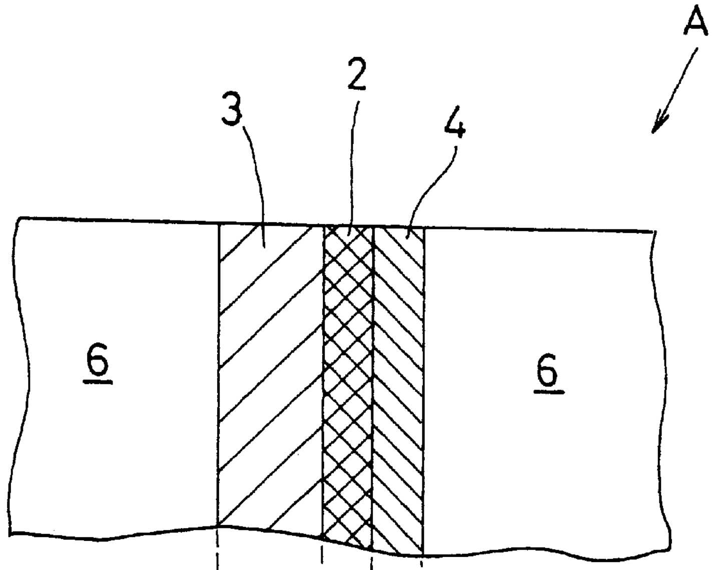
FIG.2 ( B )
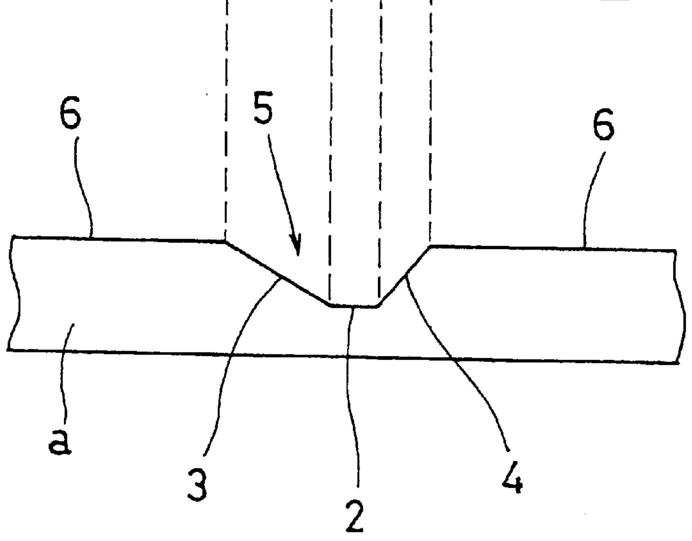

FIG.3 ( A )
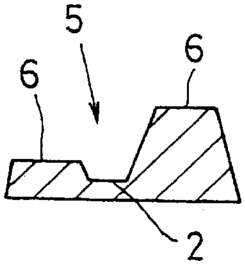
FIG.3 ( B )
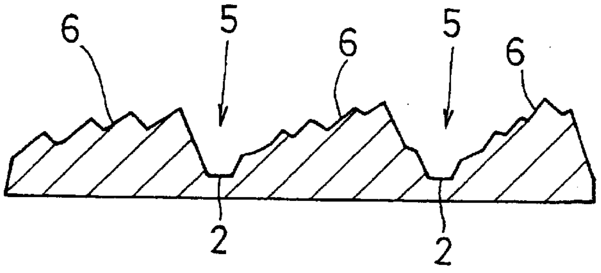
FIG.3 ( C )
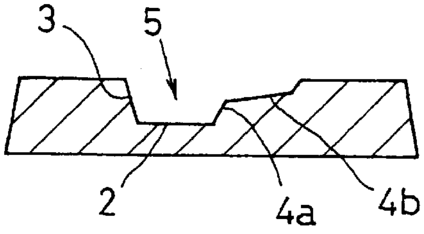
FIG.3 ( D )
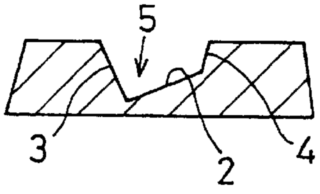
FIG.3 ( E )
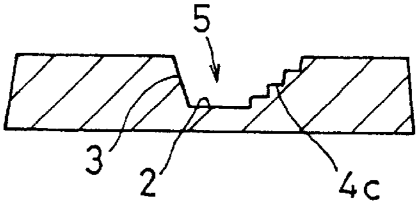
FIG.3 ( F )
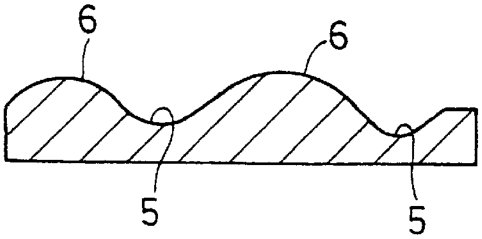
FIG.3 ( G )
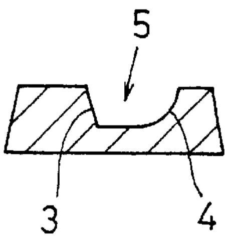

FIG.4 ( A )
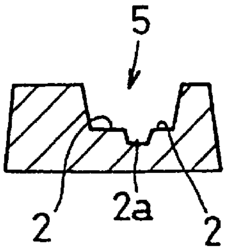
FIG.4 ( B )
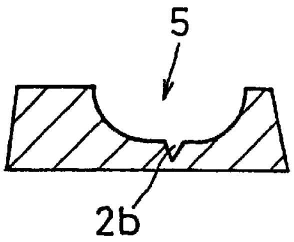
FIG.4 ( C )
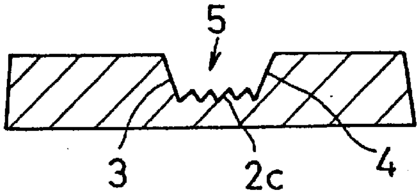
FIG.4 ( D )
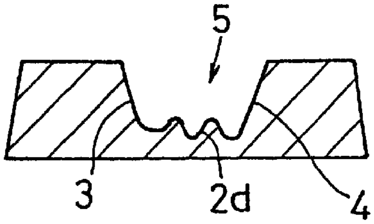
FIG.4 ( E )
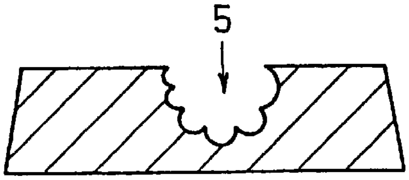
FIG.4 ( F )
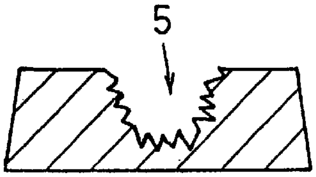
FIG.4 ( G )
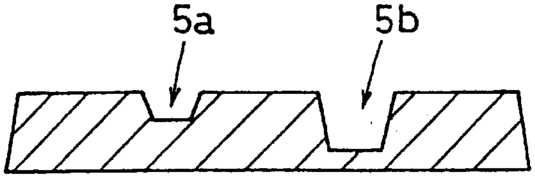
FIG.4 ( H )
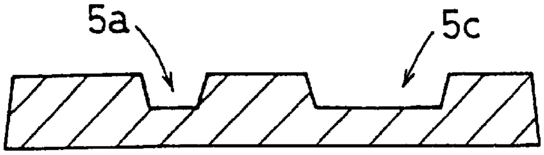

FIG.5 ( A )
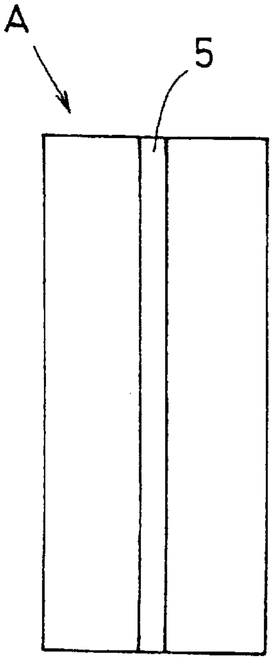
FIG.5 ( B )
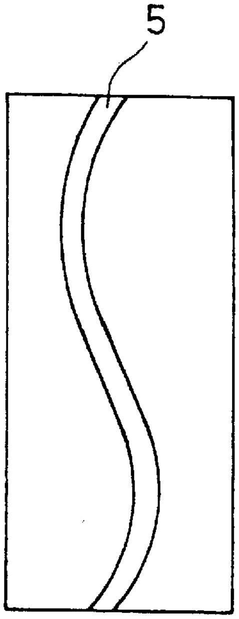
FIG.5 ( C )
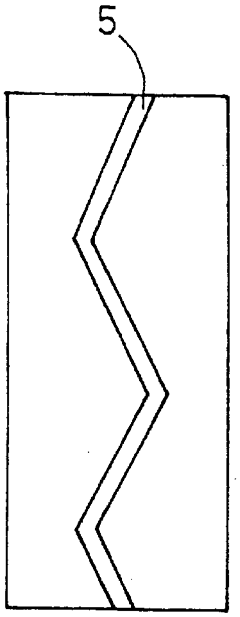
FIG.5 ( D )
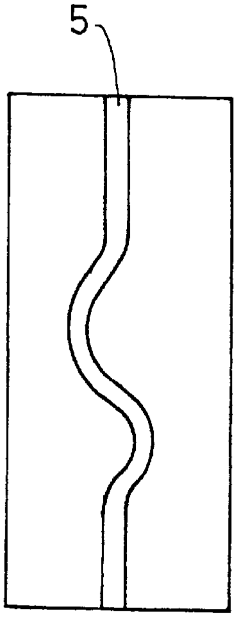
FIG.5 ( E )
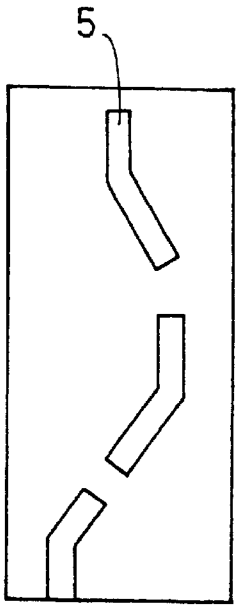
FIG.5 ( F )
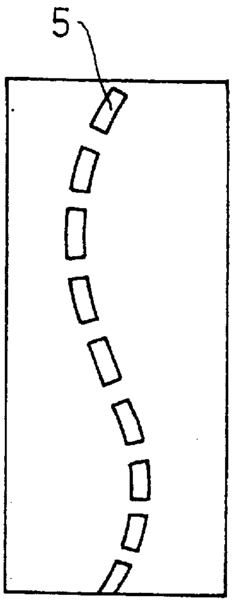

FIG.6 ( A )
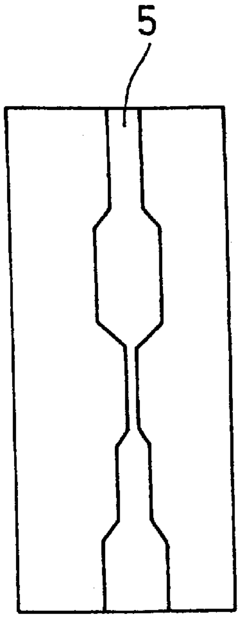
FIG.6 ( B )
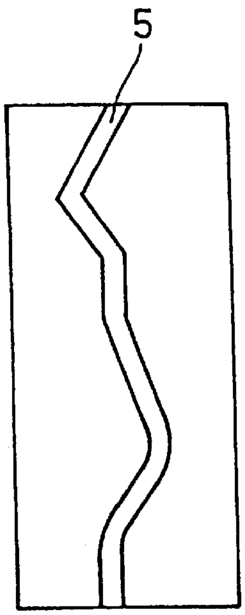
FIG.6 ( C )
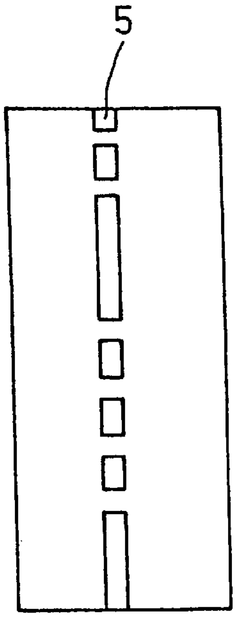
FIG.6 ( D )
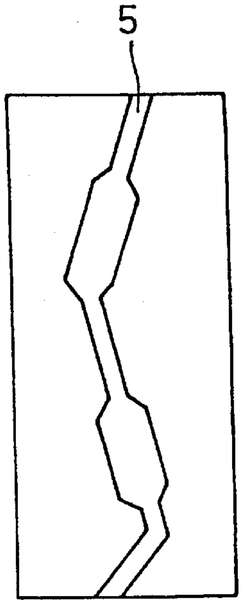
FIG.6 ( E )
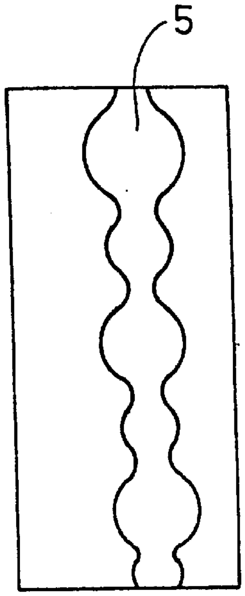
FIG.6 ( F )
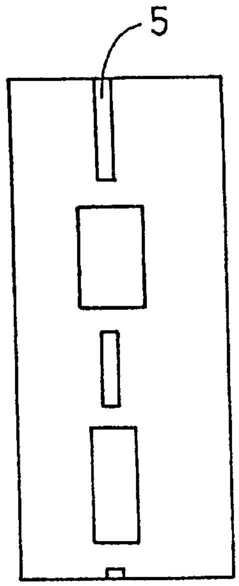

FIG.7 ( A )
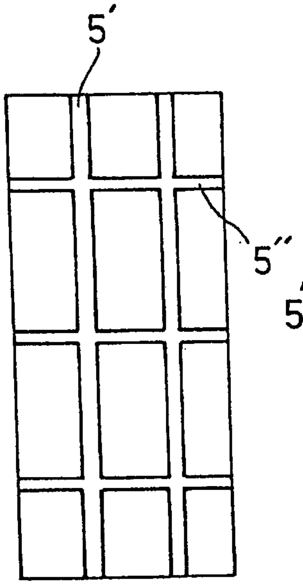
FIG.7 ( B )
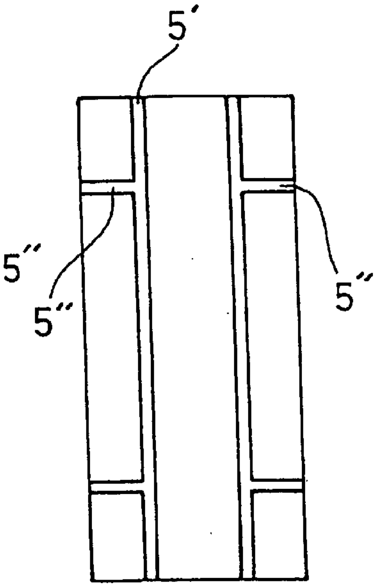
FIG.7 ( C )
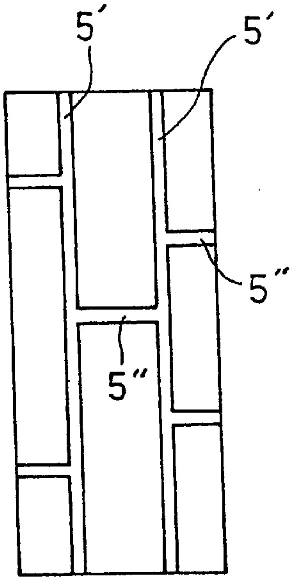
FIG.7 ( D )
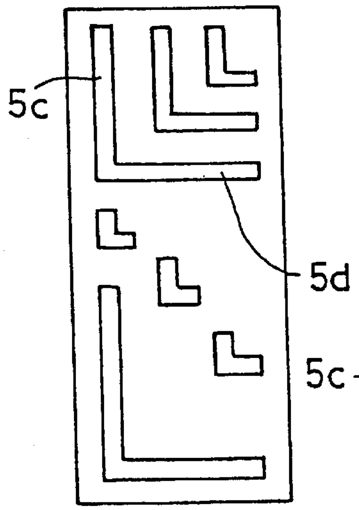
FIG.7 ( E )
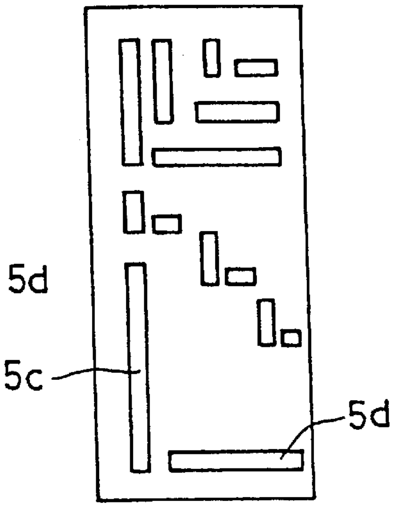

FIG.34 ( A )
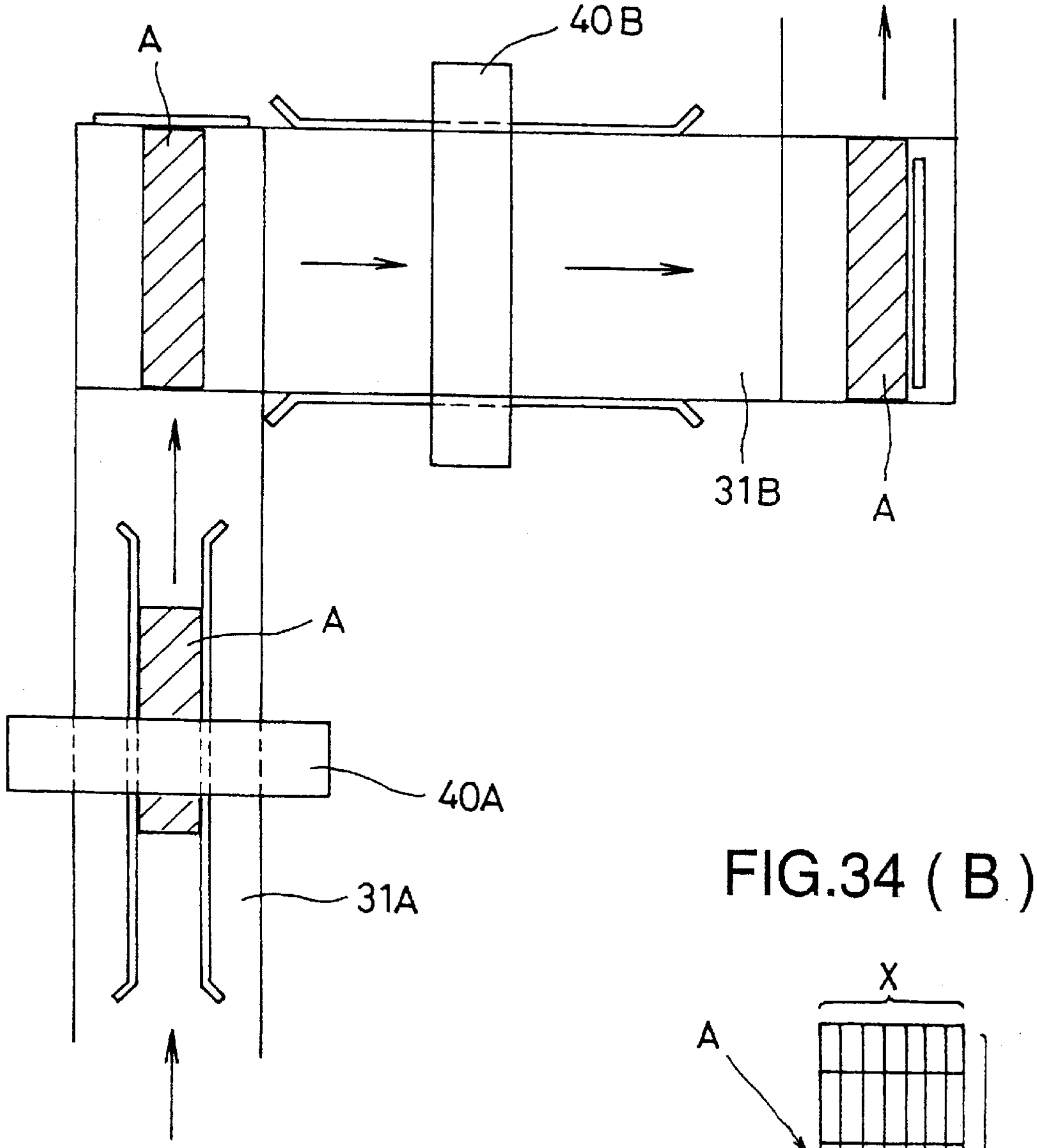
FIG.34 ( B )
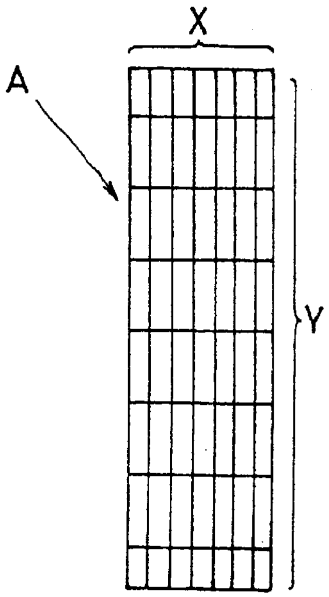

BUILDING BOARD AND METHOD AND APPARATUS FOR COATING BUILDING BOARD

BACKGROUND OF THE INVENTION

1. Field of the Invention

The present invention relates to a building board, and method and apparatus for coating a building board. In particular, it relates to a building board having concavities such as grooves to which a shade-coating is effectively applied to obtain an aesthetically enhanced building board.

2. Description of the Prior Art

Building boards having grooves in its surface are widely used, and the surface is generally coated to obtain an aesthetically enhanced building board. In a conventional coating method, a spray coating of a joint portion color is applied to a surface of a substrate such as a cement board in such a manner that grooves are also coated, and then a coating of an appropriate color is applied to the surface by a roll coater method, a curtain flow coater method or the like.

FIG. 37 is a cross-section of a conventional building board having its surface subjected to surface coating by a roll coater method. The building board (a) has grooves 5 in its surface. In the surface coating, a coating (a1) of a joint portion color is first formed over the whole surface including the grooves 5 by a spray coating method, and then an appropriate coating (a2) is formed on convexities (surface plateau) by a roll coater method. In a roll coater method, if the convexities are even as shown in FIG. 37, a uniform coating is formed. However, with respect to a building board having a surface with considerable irregularities, a non-uniform coating is formed. Accordingly, appropriate surface coating cannot be effected. Further, it is impossible by a roll coater method to apply a specific coating to the grooves 5. The grooves 5 are coated merely with the spray coating (a1) of a joint color, and thus all surfaces defining the grooves 5 have substantially the same color depth. It is, therefore, impossible to impart a delicate impression of shading to the grooves 5. If a sponge roll is used, a uniform coating can be applied to a surface with irregularities to some extent. Practically, however, this is only possible up to an up-and-down roughness of about 3 mm. Further, a desired specific coating cannot be applied to the grooves 5.

In a curtain flow coater method or the like, a coating to some extent can be applied even to an up-and-down surface with considerable roughness of a building board, and the coating can be applied also to the grooves continuously. However, the coating has uniform thickness and color depth. Accordingly, a coating with shading cannot be applied to the grooves. Further, although a somewhat suitable coating can be applied to rectilinear grooves, a uniform coating cannot be applied to curved grooves or grooves with a varying groove width. Moreover, coating by a curtain flow coater method has a lower limit in a width of a groove to which it can be applied. Accordingly, if grooves are narrow they are difficult to coat in a satisfactory manner.

Due to the above problems, conventional surface-coated building boards unavoidably give a person viewing the boards a strong impression of flatness as a whole. In particular, such boards have a poor impression of shading at concavities such as grooves. It is impossible using such building boards to obtain a highly aesthetic building board. Furthermore, both of the above-described methods are directed to application of a coating to a building board having a relatively flat surface geometry, for example, a building board having a flat surface formed with several linear grooves. Accordingly, such methods related to coating flay surfaces are incapable of applying a desired coating to a building board having a surface with complicated irregularities or a complicated pattern. In recent years, it has been possible to easily prepare a building board having a complicated surface geometry by an extrusion molding method or a cast molding method which is highly formative. These extruded building boards have increased the demand to apply a desired coating to a surface having complicated irregularities, in particular, concavities in the surface. However, an aesthetically satisfactory surface coating has not yet been obtained.

It is an object of the present invention to provide a building board having a highly aesthetic surface which has not been obtained by any conventional coating methods. In particular, this object is achieved through application of a coating capable of giving a viewer strong impression of shading to a complicated linear or curved concavity having a varying cross-sectional geometry in a crosswise direction of the concavity. Using the method of the present invention, one can obtain a building board having a highly aesthetic surface.

It is another object of the present invention to provide coating method and apparatus which are capable of easily applying a coating exhibiting an enhanced impression of shading to concavities with complicated geometries formed in a surface of a building board.

According to the present invention there is provided a building board having its surface provided with a concavity having a bottom and right and left sides, the concavity being coated in such a manner that a color of the coating is deepest in the bottom and gradually becomes lighter in the sides from the bottom to the surface.

According to the present invention there is provided a building board having its surface provided with a concavity having a bottom and right and left sides, and the right and left sides of the concavity are coated in such a manner that an average color depth of the coating in the side having a larger horizontal component is lighter than that in the side having a smaller horizontal component when the concavity is horizontally projected from above.

In the building board constructed as described above, the coating in the concavity has an emphasized shade difference, thereby giving a viewer strong impression of shading. As a consequence, color depth is emphasized thereby obtaining a highly aesthetic building board.

In the present invention, there is no particular restriction with respect to the cross-sectional geometry in crosswise direction of the concavity. The cross-sectional geometry in crosswise direction of the concavity is not restricted to one having clear demarcation points between a bottom and a side and between a side and a surface, for example, a substantially gutter-like cross-section. It may be one having unclear demarcations or continuous one (i.e., unangular one). It includes any one having an apparent "bottom" and apparent "sides". Accordingly, the term "bottom" used herein has such a wide meaning that a "bottom" includes a portion recognizable as an apparent "bottom", and the term "side" used herein has such a wide meaning that a "side" includes a portion recognizable as an apparent "side". Each of the "bottom" and "side" may not be a flat surface, and may be an irregular surface, a curved surface or the like.

The present invention discloses a method for coating a building board having; a bottom and right and left sides, the method comprising:

jetting paint as a regulated jet in the form of a paint membrane while jetting air along right and left edges of the paint membrane by means of a coating nozzle provided with a center orifice for jetting paint and air-jet orifices for jetting air along right and left edges of the paint membrane to carry out the coating of the concavity in such a manner that paint atomized into minute particles by the jetted air is mainly applied to the sides of the concavity. According to this method, color of right and left portions of the resulting coating pattern is light as compared with that of a center portion and becomes gradually lighter with distance from the center portion. By virtue of this, it is possible to easily apply a coating to a concavity in such a manner that a color of the coating is deepest in the bottom and gradually becomes lighter in the sides from the bottom to the surface.

The present invention further discloses a method for coating a concavity in a building board having its surface provided with a concavity having a bottom and right and left sides, the method comprising:

taking an image of the concavity in the surface by image pick-up means such as a digital camera to obtain information on a cross-sectional geometry in a crosswise direction of the concavity from the picked-up image data, and controlling a level and an inclination angle of a coating nozzle based on the information, thereby permitting the color depth of one side to be lighter or deeper than that of the other side.

Using this method, the level and inclination angle of the coating nozzle to be continuously controlled by using the data gained from image processing, so it is possible to easily apply a coating to concavities having any plan geometry such as straight curved or zigzag one.

It is preferred that the information on a cross-sectional geometry in the crosswise direction of the concavity be coordinates of both ends of the bottom of a cross-section of the concavity and coordinates of intersection points of the right and left sides with the surface of the building. Lengths of line segments into which a line segment connecting the intersection points of the right and left sides and the surface of the building board are divided by intersection thereof with a vertical line passing through the middle point of the bottom and calculated based on the coordinate information. A level and an inclination angle of the coating nozzle can be so controlled that an average color depth of the side under the larger line segment is lighter than that of the side under the smaller line segment.

Further, the present invention discloses an apparatus for coating a concavity of a building board having its surface formed with a concavity having a bottom and right and left sides, the coating apparatus comprising:

a conveyor for transferring a building board, and at least one coating nozzle for applying a coating to a concavity in a surface of a building board transferred by the conveyor, each of the coating nozzles being adjustable in its level and jetting direction, the level and jetting direction of the coating nozzle being controlled based on information on a cross-sectional geometry in crosswise direction of a concavity to be coated.

By using the coating apparatus, it is possible to easily prepare a building board aesthetically enhanced in such a manner that a color of the coating is deepest in the bottom and gradually becomes lighter in the sides from the bottom to the surface or a highly aesthetic building board having color depth difference between the right and left sides.

Preferably, the coating apparatus further comprises means for taking an image of the concavity, and means for controlling a level and an inclination angle of a coating nozzle based on information obtained by taken image data, thereby effecting control of the level and inclination angle of the coating nozzle in line with the geometry of the concavity. More preferably, the coating apparatus further comprises means for detecting edges as intersections between the sides and the surface of the concavity. Based on the information on the edges, control of the position of the coating nozzle and suspension/resumption of the paint jetting from the coating nozzle, change of pressure of paint jetting from the coating nozzle, etc. are effected, thereby enabling application of an aesthetically enhanced coating to the concavity.

The coating apparatus may be used alone. Further, more than one coating apparatus may be placed at angles with each other to cause a building board to be coated to successively pass through the plurality of coating apparatus, thereby continuously applying a coating aesthetically enhanced as described above to a number of concavities FIG. 1(A) and FIG. 1(B) are enlarged perspective views of a concavity in the building board according to the present invention.

FIG. 2(A) and FIG. 2(B) are enlarged views in plan and in section of another concavity in the building board according to the present invention.

FIG. 3(A) to FIG. 3(G) show cross-sections in the crosswise direction of concavities in the building board according to the present invention.

FIG. 4(A) to FIG. 4(H) show cross-sections in the crosswise direction of other concavities in the building board according to the present invention.

FIG. 5(A) to FIG. 5(F) show planar geometries of concavities in the building board according to the present invention.

FIG. 6(A) to FIG. 6(F) show planar geometries of other concavities in the building board according to the present invention.

FIG. 7(A) to FIG. 7(E) show planar geometries of still other concavities in the building board according to the present invention.

FIG. 34A is a plan view illustrating a system for applying a coating according to the present invention to a building board (A) formed with longitudinal grooves (X) and transverse grooves (Y), and FIG. 34(B) shows an example of the building board (A).

DESCRIPTION OF THE PREFERRED EMBODIMENTS

Figure 8:
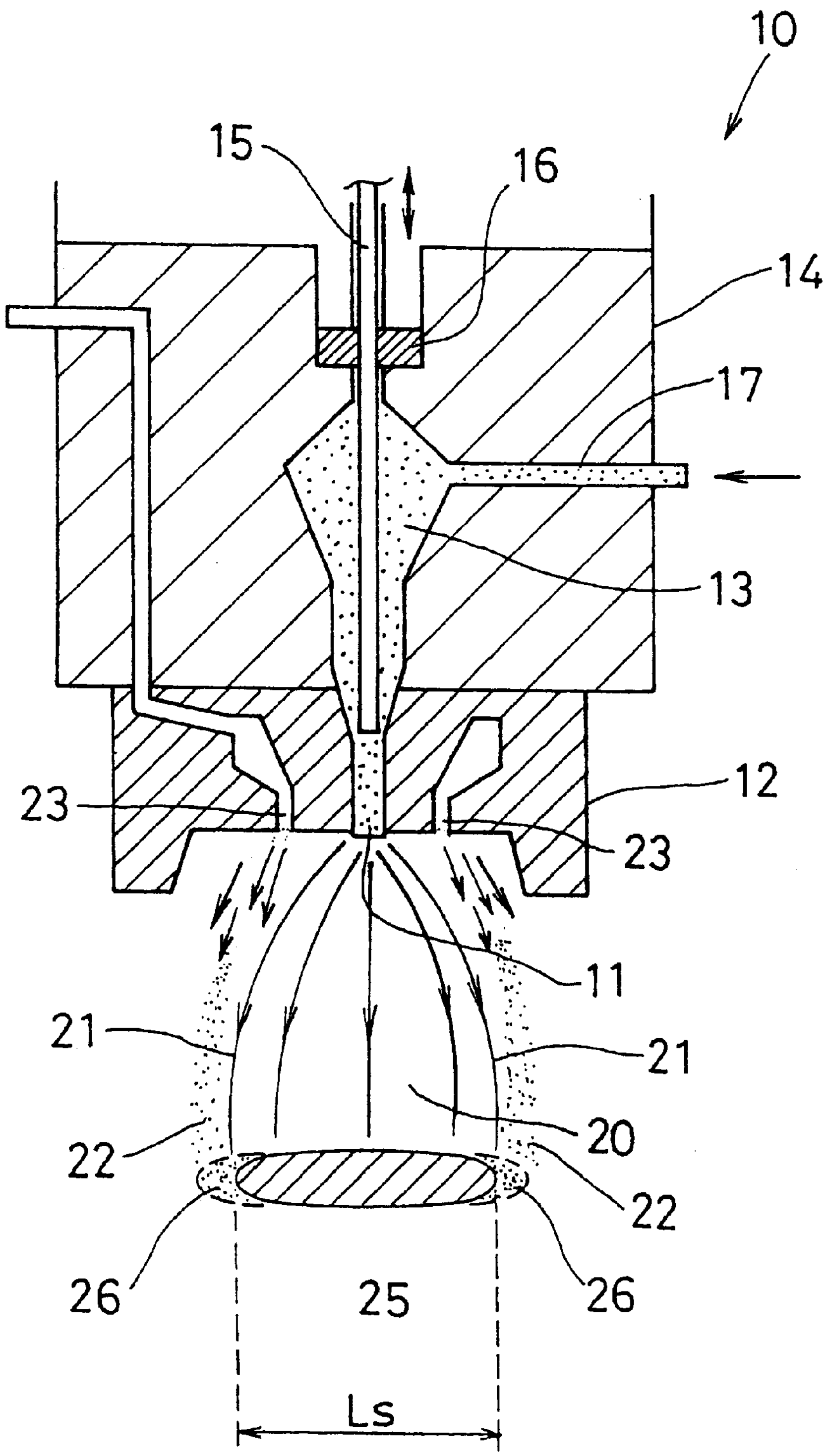
FIG. 8 is a sectional view illustrating the coating nozzle.

In the following, embodiments of the present invention will be described in detail with reference to the accompanying drawings.

FIG. 1 shows enlarged perspective views of a concavity in an embodiment of the building board (A) according to the present invention. In the embodiment shown in FIG. 1(A), a base 1*a* is a cement board having its surface formed with grooves 5 as concavities. The groove 5 consists of a bottom 2 and right and left sides 3, 4, and has a symmetrical cross-section in crosswise direction. The groove 5 is provided with a coating by the coating method which will be described below. The coating shows such color gradation that its color is most deep in the bottom 2 and vicinities thereof and, in the right and left sides 3 and 4, the color gradually becomes lighter from the bottom 2 to the surface 6 in the direction of the arrow Y shown in FIG. 1(A). The color of the coating may arbitrarily be selected. For example, the color may be one exhibiting substantially the same tone as that of a joint in a conventional building board, or maybe another color to attain an aesthetic design. It is to be noted that although boundaries with respect to depth of the color are shown in FIG. 1 for convenience of illustration, the color is gradated in an actual product and thus no boundaries are observed.

The coating of the groove 5 may be carried out prior to or subsequently to that of the surface 6. In the latter case, if the surface 6 is subjected to, for example, spatter coating 6*a* by means of spray or the like as shown in FIG. 1(B), an uncalled-for spatter pattern deposited in the groove 5 can be brought to disappearance with ease. In consequence, the spatter pattern on the concavities (surface) is emphasized, thereby obtaining an aesthetically enhanced building board (A).

The application of such a coating exhibiting color depth gradation to the groove 5 gives a viewer a strong impression of shading, thereby providing the impression of a depth enhanced over the real depth. Consequently, an aesthetically enhanced building board is attained.

FIG. 2(A) shows an enlarged view in plan and FIG. 2(B) shows an enlarged view in section of a concavity of another embodiment of the building board (A) according to the present invention. In this embodiment, grooves 5 formed in its surface have an asymmetrical cross-section in crosswise direction. Specifically, one side 4 is slanted more sharply than the other side 3. Accordingly, when the groove 5 is horizontally projected (or viewed in plan), the left side 3 has a horizontal component larger than that of the right side 4. In this embodiment, a coating is applied in such a manner that an average depth of color in the side having a larger horizontal component (i.e., the left side 3) is lighter than that in the side having a smaller horizontal component (i.e., the right side 4).

When a building board (A) formed with grooves 5 having a geometry as shown in FIG. 2 is attached to a building, the side 3 having a smaller inclination angle catches viewer's eyes more than the other side 4. Even if the coating has a uniform depth of color throughout the groove 5, the more eye-catching side 3 tends to look lighter and the less eye-catching side 4 tends to be eclipsed and thus to look darker. The embodiment of FIG. 2 utilizes this sight phenomenon (optical illusion). By applying the coating in such a manner that an average depth of color in the side having a larger horizontal component (i.e., the left side 3) is lighter than that in the side having a smaller horizontal component (i.e., the right side 4), shade differences therebetween are further emphasized. This gives a viewer the impression of convexity-concavity contrast enhanced over the real contrast, thereby obtaining a highly aesthetic building board (A).

Also in this embodiment, as in the embodiment shown in FIG. 1, color depth in both or one of the right and left sides 3, 4 may be gradated in such a manner that the color gradually becomes lighter from the bottom 2 to the surface 6, although gradation is not shown in FIG. 2. This enables a further aesthetically enhanced product to be realized.

In the building board (A) according to the present invention, there is no particular restriction with respect to the geometry, in cross-section in crosswise direction and in plan, of the groove 5 formed in the surface the building board (A). Any geometry may be selected. FIGS. 3A to 3G and 4(A) to 4(H) show examples of the cross-section in crosswise direction of the groove as a concavity. FIG. 3(A) shows one wherein the groove 5 is a typical groove but the surface 6 is not flat (in other words, convexities 6, 6 are not flush with each other); FIG. 3(B) one wherein the groove 5 is a typical groove but each convexity 6 has irregularities; FIG. 3(C) one wherein one side 4 of the groove 5 has slopes 4*a,* 4*b* having different inclination angles; FIG. 3(D) one wherein the groove 5 has a slant bottom 2; FIG. 3(E) one wherein one side 4*c* of the groove 5 is in the form of steps; FIG. 3(F) one wherein the surface convexities 6 and groove concavities 5 constitute continuous waves as a whole; and FIG. 3(G) one wherein one side 4 of the groove 5 is a curved surface.

FIG. 4(A) shows one wherein the bottom 2 of the groove 5 is formed with a depression 2*a;* FIG. 4(B) one wherein the groove 5 is a continuous curved surface having its bottom portion formed with a groove 2*b;* FIG. 4(C) one wherein the bottom 2 of the groove 5 has an irregular surface 2*c;* FIG. 4(D) one wherein the bottom 2 of the groove 5 has a corrugated surface 2*d,* FIG. 4(E) one wherein the groove 5 as a whole has a continuous surface with irregularities; FIG. 4(F) one wherein the groove 5 as a whole has another continuous surface with irregularities; FIG. 4(G) one wherein the grooves 5 are a plurality of grooves 5*a,* 5*b* having different depths and extending in the longitudinal direction of the building board; and FIG. 4(H) one wherein the grooves 5 are a plurality of grooves 5*a,* 5*c* having different widths and extending in the longitudinal direction of the building board.

It is to be noted that these are shown by way of examples and many other variations may be made.

FIGS. 5(A) to 5(F), 6(A), to 6(F) and 7(A) to 7(D) show examples of geometry of the groove 5 formed in the surface of the building board (A) when the building board (A) is viewed in plan. FIG. 5(A) shows a rectilinear groove 5; FIG. 5(B) a sigmoidally curved groove 5; FIG. 5(C) a zigzag groove 5; FIG. 5(D) a groove 5 of combination of linear and curved portions; FIG. 5(E) a discontinuous zigzag groove 5; and FIG. 5(F) a discontinuous sigmoidally curved groove 5.

FIG. 6(A) shows a straight groove 5 having portions of different widths; FIG. 6(B) a groove having zigzag and curved portions which are continuously formed; FIG. 6(C) a discontinuous linear groove 5; FIG. 6(D) a zigzag groove having portions of different widths; FIG. 6(E) a straight groove 5 having portions of different widths in continuous gourd-like shape; and FIG. 6(F) a discontinuous straight groove 5 having segments of different widths.

Each of FIGS. 7(A) to 7(E) shows grooves 5 comprising longitudinal grooves 5' and transverse grooves 5". FIG. 7(A) shows longitudinal grooves 5' and transverse grooves 5" which intersect in a pattern of check; FIG. 7(B) longitudinal grooves 5' and transverse grooves 5", in which the former grooves are not connected with each other by the latter grooves; and FIG. 7(C) shows longitudinal grooves 5' and transverse grooves 5" which the former is arranged rectilinear parallel and the latter is arranged discontinuously in straight lines, and the former connects the latter in a right angle in T-shape to form a pattern of check in the surface of the building board. FIG. 7(D) shows a plurality of large and small substantially L-shaped grooves comprising portions 5*c* and 5*d* which are arranged with common orientation; and FIG. 7(E) large and small substantially L-shaped grooves, in which portions 5*c* and 5*d* are unconnected.

To the whole or an appropriately selected portion of grooves 5 having sectional and planar geometries as described above, a coating is applied in a manner as described above.

A coating nozzle preferably used for coating in a manner shown in FIGS. 1 and 2 will be described with reference to FIG. 8. The coating nozzle 10 comprises a tip portion 12 provided with an oblong elliptical paint jetting orifice 11 at its center, and a body portion 14 having a paint supply passage 13 leading to the paint jetting orifice 11. Into the paint supply passage 13, a poppet bar 15 is inserted which is movable in the vertical direction by means of a solenoid or other mechanism (not shown) to control termination and initiation of jetting and amount of a jet of paint. Reference number 16 represents a packing concurrently serving as a leakage preventive member and a guide.

The paint supply passage 13 is provided with a side path 17, and the side path 17 is connected to a pressurized paint supply source (not shown). The tip portion 12 is also provided with air-jet orifices 23, 23 on both sides of the paint jetting orifice 11 so as to jet low pressure air toward vicinities of both ends 21, 21 of a paint membrane 20 jetted from the paint jetting orifice 11. The air-jet orifices 23, 23 are connected to a pressure-controlled air supply source (not shown).

In the coating nozzle 10, the paint jetting orifice 11 has an oblong elliptical shape. Accordingly, by adjusting position of the poppet bar 15, a paint supplied from the pressurized paint source via the paint supply passage 13 is jetted from the paint jetting orifice 11 at pressure of about 0.5 to about 2.0 $kg/cm^2$ into a regulated fan-shaped jet, which yields a linear coating pattern 25. As shown in FIG. 8, air jets from the air-jet orifices 23, 23 are directed tangentially to the vicinities of both the ends 21, 21 of the paint membrane 20, which is to yield a linear coating pattern, preferably at pressure of about 1.0 to about 2.0 $kg/cm^2$. In consequence, the end portions of the jetted paint membrane 20 are atomized into minute particles 22, 22, and thus the resulting linear coating pattern 25 comprises a center portion and gradated end portions 26, 26. In other words, the linear coating pattern has such color depth gradation that color depth of the end portions 26, 26 is lighter than the center portion and gradually becomes lighter outward.

By means of a coating apparatus equipped with the coating nozzle 10, a coating is applied to concavities of a building board. In the coating operation, the coating apparatus is positionally controlled so as to cover a bottom of a concavity with the center portion of the linear coating pattern derived from the paint membrane 20 jetted as a regulated jet. On the other hand, right and left sides of the concavity are thereby exposed mainly to the minute particles, into which the end portions of the paint membrane are atomized by jetting the low pressure air, to cover the right and left sides of the concavity mainly with the end portions 26, 26 of the linear coating pattern. In consequence, a coating is applied in such a manner that the color is deepest in the bottom and, in the sides, it becomes gradually lighter from the bottom to the surface, as shown in FIG. 1. As a result, impression of deep shade in the bottom is emphasized. This gives a viewer impression of convexity-concavity contrast enhanced over the real contrast, thereby attaining an aesthetically improved building board surface.

Subsequently, a case will be described wherein a coating is applied to concavities having an asymmetrical cross-section in crosswise direction by means of a coating apparatus equipped with the coating nozzle 10 as described above. According to the coating method according to the present invention, with respect to right and left sides of such a concavity, a coating is applied in such a manner that an average depth of color in one having a larger horizontal component when the concavity is horizontally projected (or viewed in plan) than that in the other having a smaller horizontal component when the concavity is horizontally projected.

As described above, when such a concavity formed on a surface of a building board (A) is viewed from right above, one of right and left sides relative to a center of a bottom of the concavity is more eye-catching the other. The more eye-catching side tends to look lighter and the less eye-catching side tends to be eclipsed and thud to look darker. By applying a coating in such a manner that the right and left sides have color depth gradation as described above to obtain an aesthetically enhanced building board. In the present invention, as parameters for this purpose, there are used lengths (L1) and (L2) of two line segments into which a line segment connecting both ends of the upper opening of the concavity (i.e., a line segment connecting intersection points of the right and left sides with the surface of the building board) is divided by intersection thereof with a vertical line (L) passing through the middle point of the bottom 2 of the concavity. Since one side of the concavity under the longer line segment looks lighter than the other under the shorter line segment, a position and a jetting angle of the coating nozzle 10 are adjusted according to a ratio of (L1)/(L2) (when (L1)≧(L2)) or (L2)/(L1) (when (L2)≧(L1)) so that a jetting distance to the former side is longer than that to the latter side.

In the following, explanation will be given with reference to a specific example.

Figure 9:
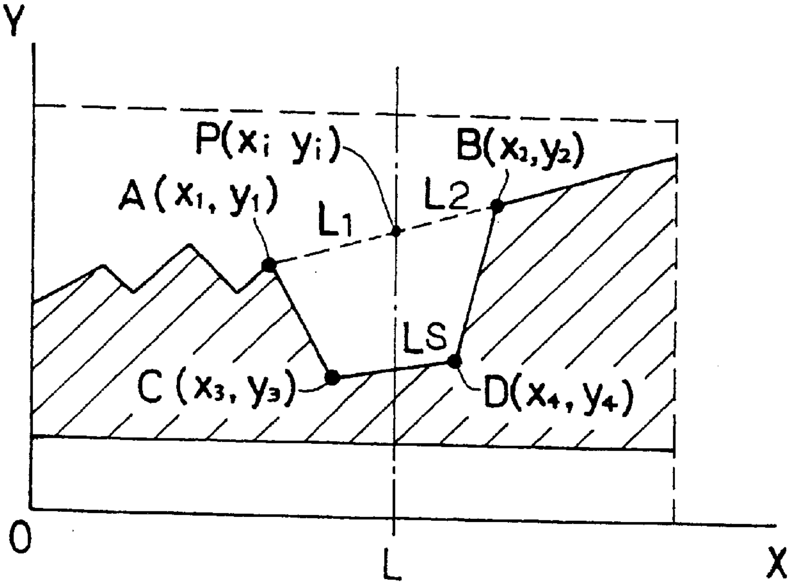
FIG. 9 is a view illustrating coordinates of the cross-section in crosswise direction of a concavity and a manner of determining the coordinates.

A concavity typically has a three-surface structure composed of both sides and a bottom. Information on a cross-sectional geometry in crosswise direction of the concavity is gained using an image pick-up appliance such as a digital camera in advance. Specifically, image data taken by the image pick-up appliance is shown on a display as shown in FIG. 9, and coordinates of each of two points (A), (B) at both ends of the upper opening and two points (C), (D) at both ends of the bottom of the groove 5 as a concavity are specified by means of a mouse or the like. In this manner, the coordinates of the four points (A, B, C and D) concerning the cross-sectional geometry in crosswise direction of the concavity are determined. Assuming that the coordinates of the four points are A(x1, y1), B(x2, y2), C(x3, y3) and D(x4, y4), coordinates (xi, yi) of a point (P) of intersection of a line segment (AB) connecting both the ends of the upper opening with a vertical line (L) passing through the middle point of the bottom (line segment CD) are obtained by the following equations expressed by the formulae (1) and (2), respectively.

$$xi=x3+(x4-X3)/2 \qquad (1)$$

$$yi=y1+\{(xi-x1)/(x2-x1)\}x(y2-y1) \qquad (2)$$

Then, a length (L1) of a line segment (AP) and a length (L2) of a line segment (PB) are determined in accordance with the following formulae (3) and (4), respectively.

$$L1=|\{(xi-X1)^2+(yi-y1)^2\}^{1/2}| \qquad (3)$$

$$L2=|\{(x2-Xi)^2+(y2-yi)^2\}^{1/2}| \qquad (4)$$

Figure 10:
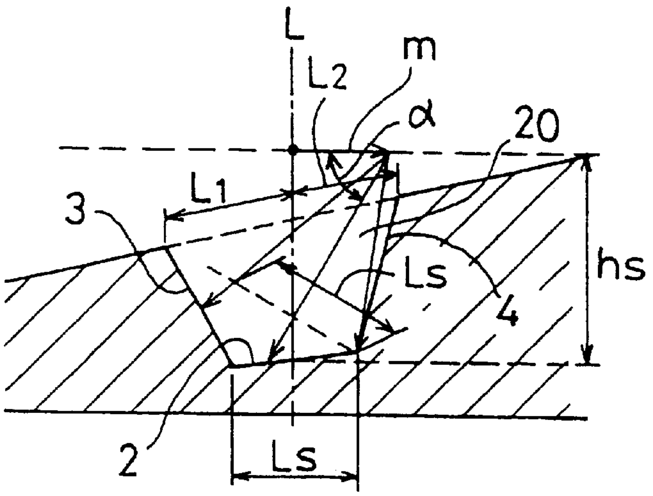
FIG. 10 is a view illustrating a manner of control of position and angle of the coating nozzle.

Then, the thus obtained lengths (L1), (L2) are compared to determine jetting direction of the coating nozzle (i.e.,to determine a side to which a jet is directed), and a jetting angle (α) is determined according to a ratio of (L1)/(L2) or L2/L1. In other words, a level of the coating nozzle, i.e., a distance (hs) from an average level of the bottom 2 of the concavity to a tip of the coating nozzle is determined, as shown in FIG. 10. The coating nozzle generally has a standard jetting (spray) distance and a coating pattern width (Ls) (see FIG. 8) corresponding to the standard jetting distance, according to the optimum operation conditions. Accordingly, as shown in FIG. 10, the level (hs) of the coating nozzle is so selected that the standard coating pattern width (Ls) is substantially the same as the width of the bottom 2 of the concavity to be coated.

Then, the coating nozzle is moved toward a line segment having the smaller one ((L2) in the illustrated example) of the lengths (L1) and (L2) to a position horizontally distant from the vertical line (L) in a given amount m according to the (L1)/(L2) ratio ((L1)>(L2)), and the jetting angle (α) of the coating nozzle is then determined. Specifically, the optimum amount (m) of the movement and the jetting angle (α) in relation thereto are determined by locating a threshold position which permits an isosceles triangular jetting pattern of a paint membrane 20 at the standard jetting (spray) distance to be formed in the groove 5 as shown in FIG. 10 by means of a construction method using the image shown on the display. In this connection, a value slightly smaller than that of the threshold position is selected as the value of (m) taking safety into consideration, and a value corresponding thereto is selected as the value of (α). This procedure is repeated with respect to some grooves as contemplated concavities having similar cross-sections in crosswise direction to obtain relationships between the (L1)/(L2) ratios and the optimum amounts (m), the jetting angles (α). With reference to the thus obtained table data, values of (m) and (α) corresponding to a (L1)/(L2) ratio of a groove as a subject are estimated by means of interpolation or the like.

In the situation as shown in FIG. 10, the coating pattern from the coating nozzle 10 at the standard jetting (spray) distance (hs) is such that one end (the right end in FIG. 10) of the coating pattern width (Ls) is positioned in the vicinity of the point (D) (see FIG. 9) and, at left positions therefrom, the surface to be coated is located at a distance larger than the standard jetting distance (hs). Accordingly, the side 3 under the larger line segment having a length of (L1) has average color depth lighter than that of the side 4 under the smaller line segment having a length of (L2). Further, since end portions of the jetted paint membrane are atomized into minute particles as described above, a coating is applied in such a manner that in the sides, color becomes gradually lighter from the bottom to the surface.

As described above, by employing the coating method according to the present invention, a coating can be applied always in such a manner that an average depth of color in the side having a larger horizontal component is lighter than that in the side having a smaller horizontal component when the concavity is horizontally projected from above (i.e., viewed in plan), and that the color is deepest in the bottom and, in the right and left sides, it becomes gradually lighter from the bottom to the surface. The coated concavity gives a viewer an impression of emphasized depth of shade, thereby attaining a building board surface aesthetically enhanced as a whole.

Figure 11:
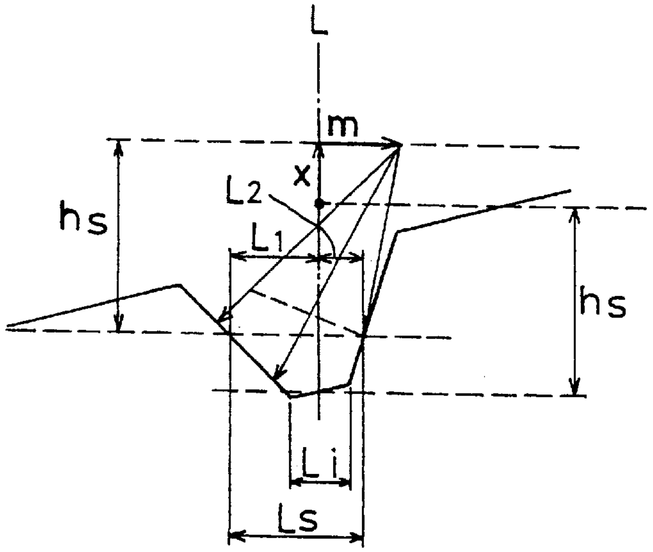
FIG. 11 is a view illustrating another manner of control of position and angle of the coating nozzle.

The bottom of the concavity can have a dimension as shown in FIG. 11. In other words, the bottom in cross-section in crosswise direction of the concavity can have a width (Li) smaller than the coating pattern width (Ls) corresponding to the standard jetting (spray) distance (hs). In such a case, the coating nozzle 10 is raised (in an amount of distance (x)) to a position which permits the coating pattern width (Ls) to span between the right and left sides. Then, lengths of line segments into which a line segment (AB) is divided by intersection thereof with a vertical line (L) passing through the middle point of the bottom 2 of the concavity are calculated in accordance with the formulae (1) to (4) as described above. Subsequently, the position and the jetting angle of the coating nozzle are determined in the same manner as described above. In this case, the jetting distance is larger than that in the example shown in FIG. 10, and an area coated with paint jetted in the form of a regulated jet also covers lower portions of both the sides. In the upper portions of the sides, however, color depth gradation can be attained as in the example in FIG. 10, leading to emphasized shade contrast. Of course, the above-described adjustment is applicable only to a case where a coating pattern width (Ls) is permitted to span between right and left sides in a cross-section of a concavity. If it is intended to apply a coating to a concavity having a cross-section which does not permit a coating pattern width Ls to span between sides, use of a coating nozzle having a smaller coating pattern width is required.

Figure 12:
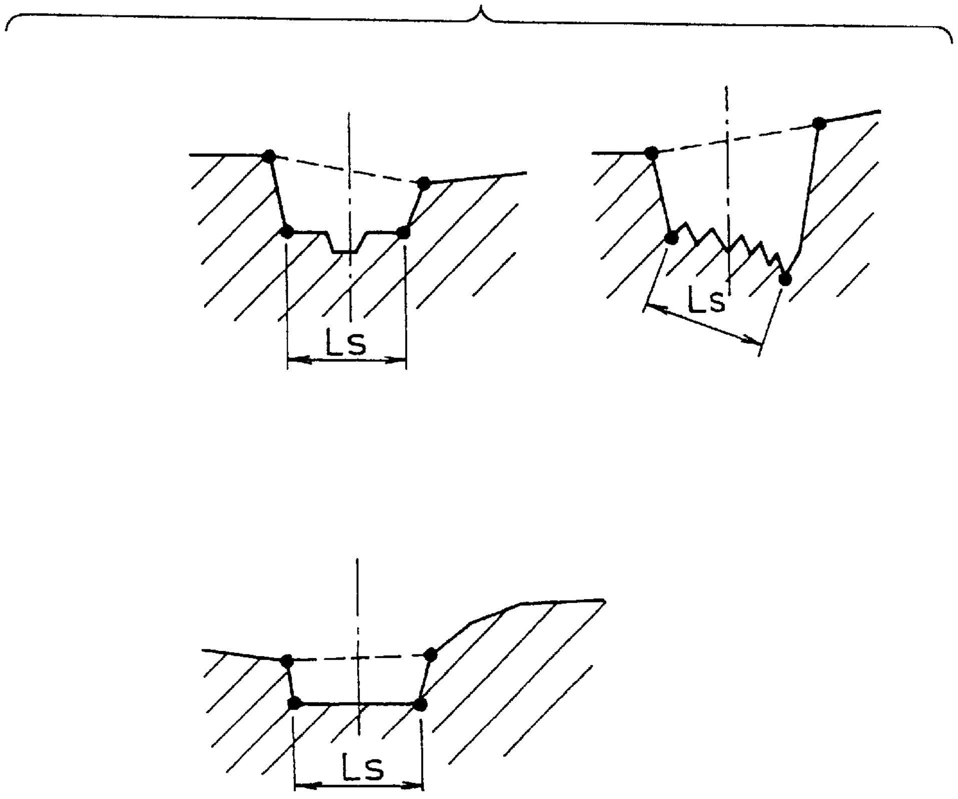
FIG. 12 shows different views illustrating other examples of coordinates of cross-section in crosswise direction of a concavity and a manner of determining the coordinates.
Figure 13:
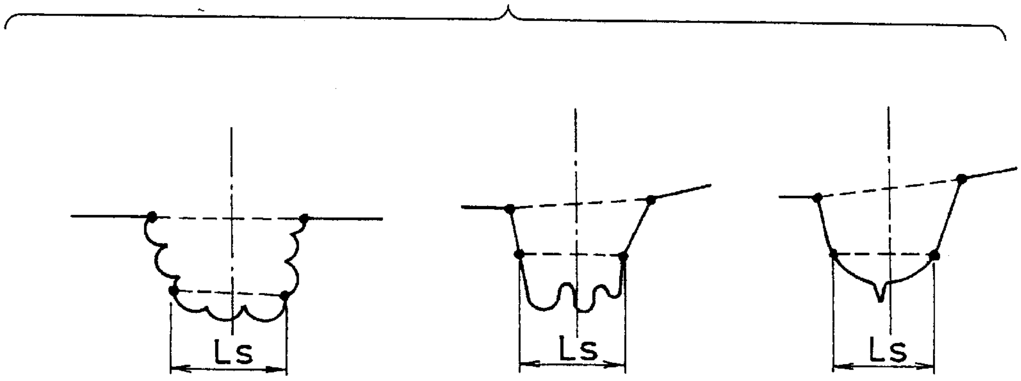
FIG. 13 shows further views illustrating still other examples of coordinates of cross-section in crosswise direction of a concavity and a manner of determining the coordinates.

In the above description, the concavities are described as examples each of which has a substantially gutter-like cross-section. In other words, each of the above-described concavities has even bottom and side surfaces and has such a cross-section that coordinates of demarcation points between the bottom and sides and coordinates of demarcation points between the right and left sides and the surface are distinct. However, the coating method according to the present invention is applicable to concavities having uneven bottom and side surfaces, curved surfaces or the like with no substantial practical problem. FIGS. 12 and 13 show some example of such concavities. FIG. 12 shows examples of concavity whose bottom has a width substantially the same as a coating pattern width (Ls) corresponding to a standard jetting (spray) distance (hs). FIG. 13 shows examples of concavity whose bottom area has a width smaller than a coating pattern width (Ls) corresponding to a standard jetting (spray) distance (hs). In any of these cases, as the coordinates of the four points (A–D) are, black points are approximately designated in an image shown on display by means of a mouse or the like. If a concavity has a cross-section as shown in FIG. 12, calculation is made in accordance with the procedure as described with reference to FIG. 10. If a concavity has a cross-section as shown in FIG. 13, calculation is made in accordance with the procedure as described with reference to FIG. 11.

Figure 14:
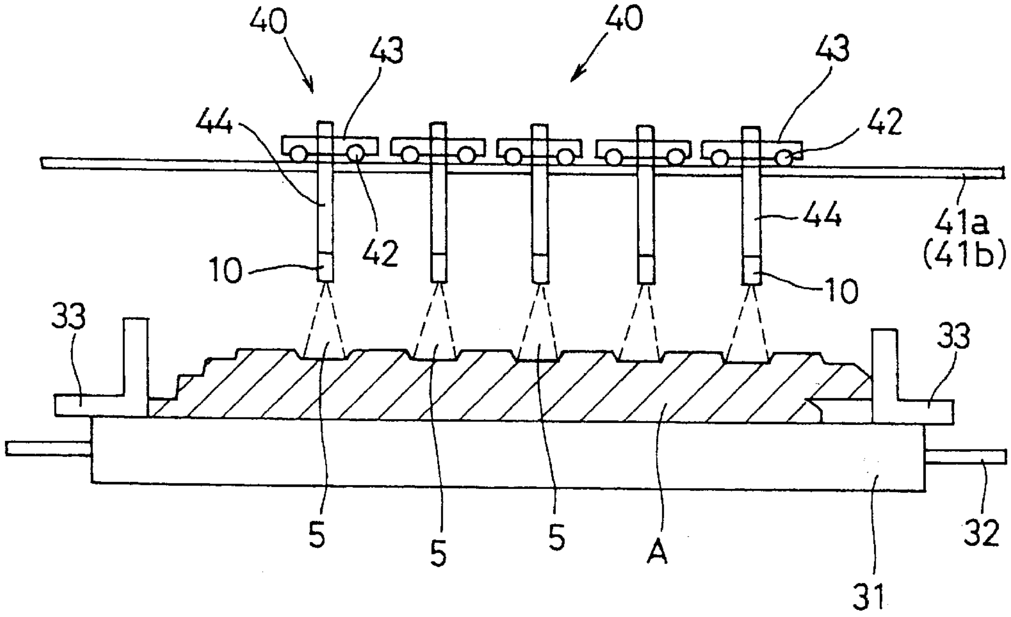
FIG. 14 is a front view illustrating a mode of use of the coating apparatus according to the present invention.

In the following, explanation will be given on an embodiment of a coating apparatus preferably used for coating a concavity formed in a building board surface in the above-described coating method. FIG. 14 is a front view of the coating apparatus 40 according to the present invention located above a building board (A) being transferred in the direction perpendicular to the sheet of the drawing. A building board (A) having its surface formed with a plurality of grooves 5 (five grooves in FIG. 14) as concavities extending in the longitudinal direction thereof is put on and transferred by a roller conveyor 31. Above the roller conveyor, coating apparatus 40 numerically corresponding to the number of the grooves 5 are arranged on rails 41*a*, 41*b* in such a manner that they are positionally controllable in the right-left direction (the direction perpendicular to the direction of the transfer of the building board (A)) along the rails 41*a*, 41*b* (see also FIG. 15). In FIG. 14, reference number 33 represents a guide for the building board (A), and reference number 32 represents a rotating shaft of the roller conveyor 31.

Figure 15:
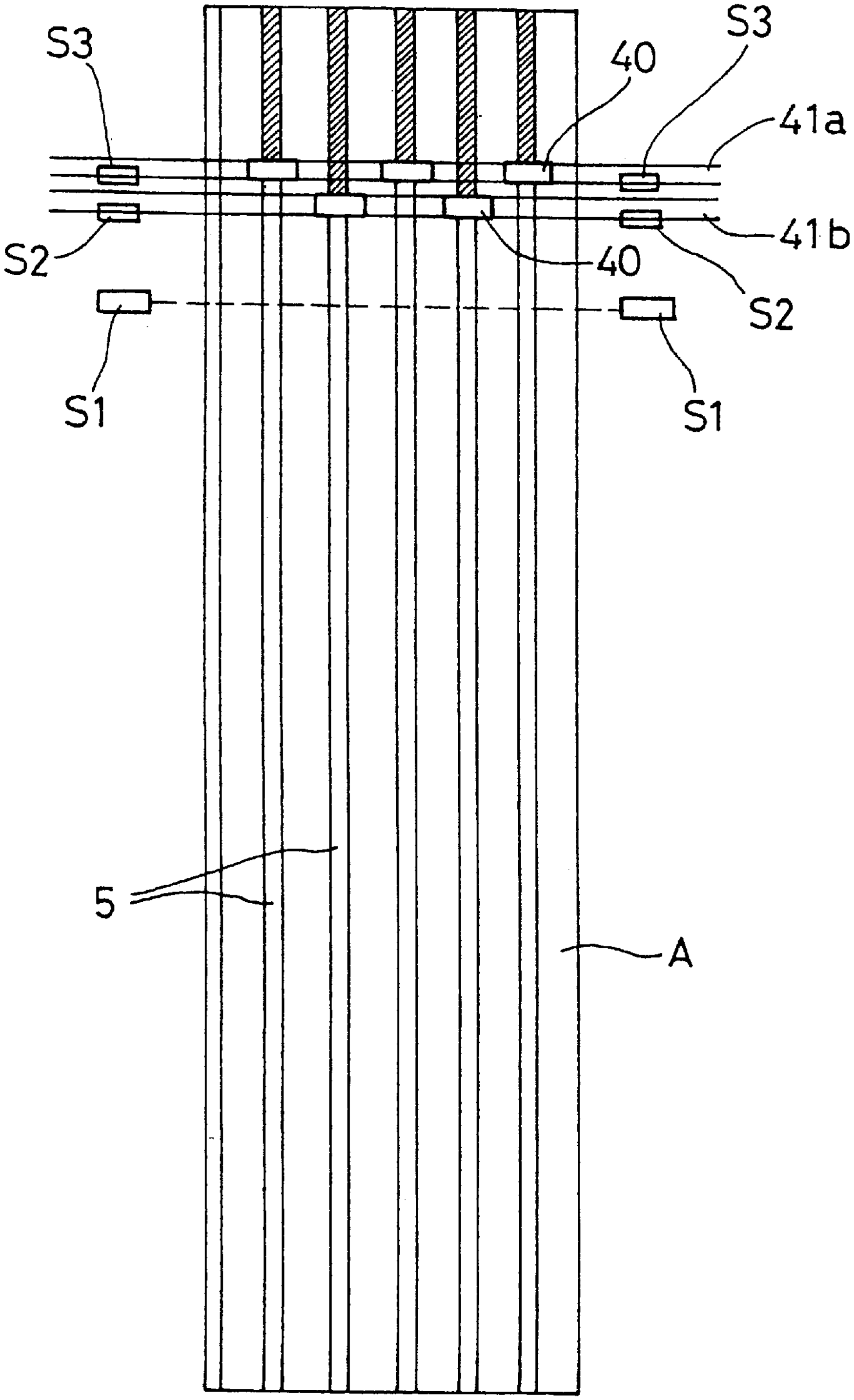
FIG. 15 is a plan view illustrating a mode of use of the coating apparatus according to the present invention.

Each of the coating apparatus 40 comprises a carriage 43 having wheels 42, and a coating nozzle holder 44 so mounted on the carriage 43 as to be positionally controllable in the vertical direction. On the tip of the coating nozzle holder 44, the coating nozzle 10 as previously described with reference to FIG. 8 is tiltably mounted. In FIG. 15, three carriages 43 and the other two carriages 43 are alternately arranged on the rails 41*a* and 41*b* to travel along the rails 41*a* and 41*b*, respectively. It is, however, to be noted that there is no particular restriction with respect to the number of the rail 41. An appropriate number of the rails 41 may be used so long as carriages 43 can be arranged without interference with each other in view of the relationship between the distance between the grooves 5, 5 and the size of the carriage 43. In FIG. 15, referential representations (S1) to (S3) denote photoelectric switches each of which comprises a light projecting element, a light receiving element and an amplifier (not shown). The (S1) is a photoelectric switch for detecting approach of the building board (A), the (S2) and (S3) are photoelectric switches for detecting passage of the building board (A) to control timings of initiation and termination of paint jetting of each coating nozzle 10.

Figure 16:
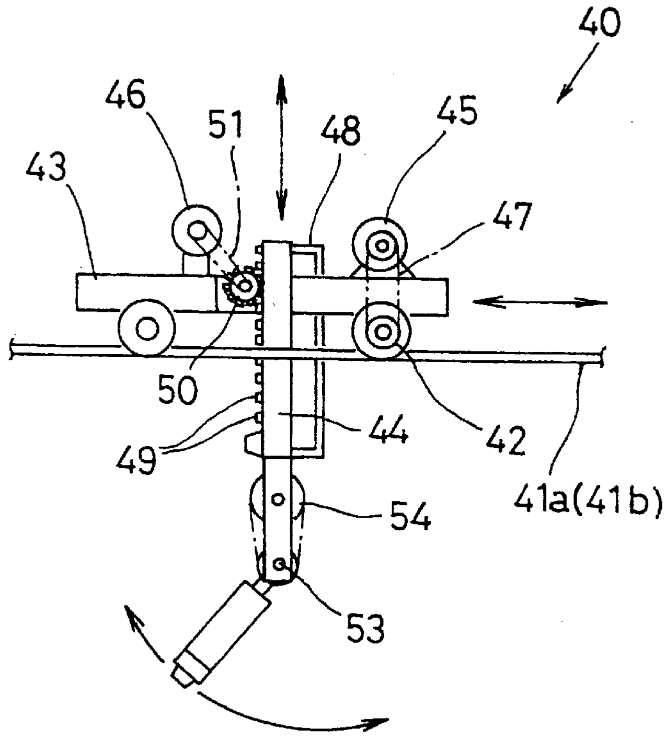
FIG. 16 is a side view illustrating an embodiment of the coating apparatus.
Figure 17:
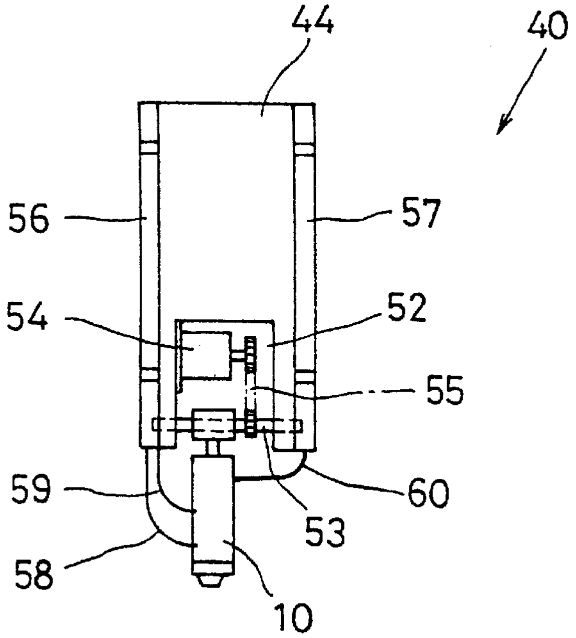
FIG. 17 is a front view illustrating a coating nozzle holder of the coating apparatus.
Figure 18:
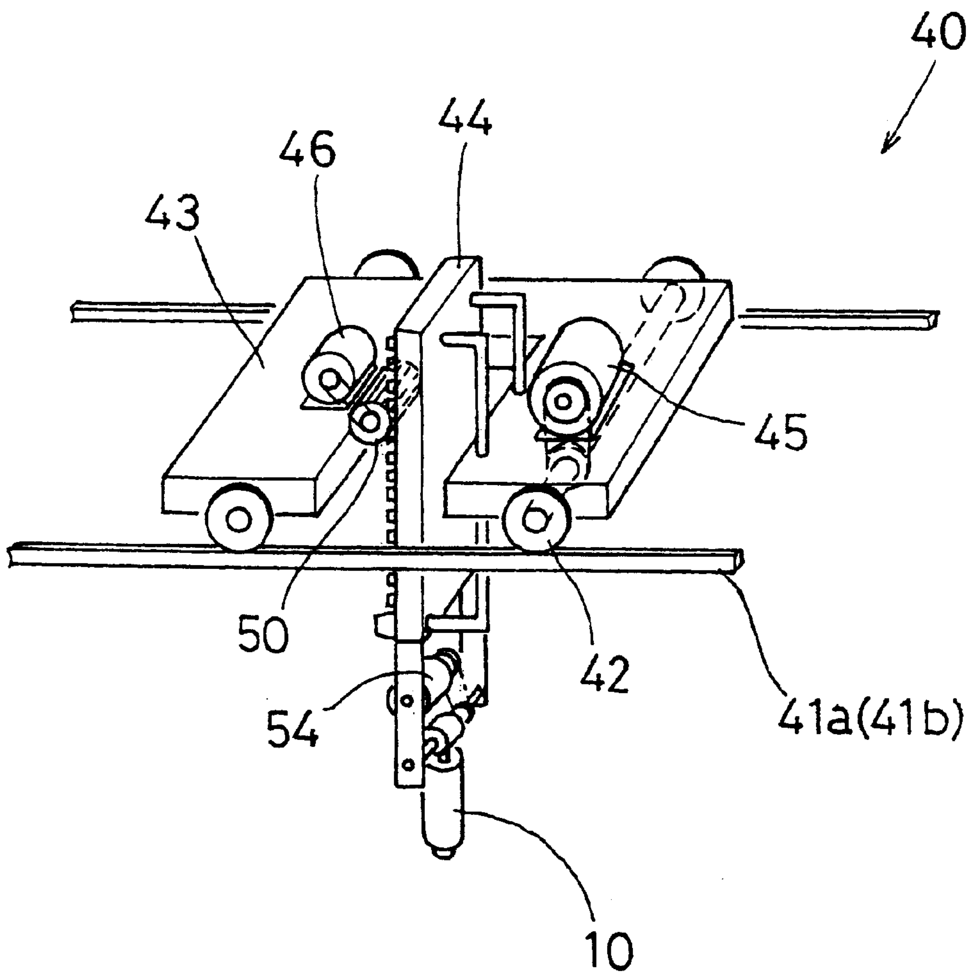
FIG. 18 is a perspective view illustrating the embodiment of the coating apparatus.

FIGS. 16 to 18 are enlarged views illustrating a main portion of the coating apparatus 40. On the carriage 43, a first stepping motor 45 for moving the carriage in the direction perpendicular to the direction of the transfer of the building board (A) and a second stepping motor 46 for vertically moving the coating nozzle holder 44 are mounted. The first stepping motor 45 drives wheels 42 via driving force transmission means 47. The second stepping motor 46 is operatively connected via driving force transmission means 51 to a pinion 50 which meshes with a rack 49 provided on the coating nozzle holder 44 mounted on the carriage 43 movably in the vertical direction via guide bars 48, thereby vertically moving the coating nozzle holder 44.

As shown in FIG. 17, the coating nozzle holder 44 has a cutout portion 52 at its lower end and, at the lower end of the cutout portion 52, a pivot pin 53 horizontally spans the cutout portion 52. On the pivot pin 53, the coating nozzle 10 as shown in FIG. 8 is mounted tiltably in the direction perpendicular to the direction of the transfer of the building board (A). Above the pivot pin 53, a third stepping motor 54 is provided which is operatively connected to the pivot pin 53 via driving force transmission means 55. The coating nozzle 10 is thereby swingable on the pivot pin 53 in the direction perpendicular to the direction of the transfer of the building board (A) by actuation of the third stepping motor 54, as shown in FIG. 16.

In both sides of the coating nozzle holder 44, passages 56 and 57 are provided. Through one 56 of the passages, there extends a paint hose 58 connected to the side path 17 for supplying paint formed in the coating nozzle 10 and an air hose 59 in communication with the air-jet orifices 23. Through the other 57, there extends a wire 60 of a control electromagnetic circuit (solenoid 72, see FIG. 19) for operating the poppet bar 15 of the coating nozzle 10 and a power supply wire (not shown) of the third stepping motor 54.

Figure 19:
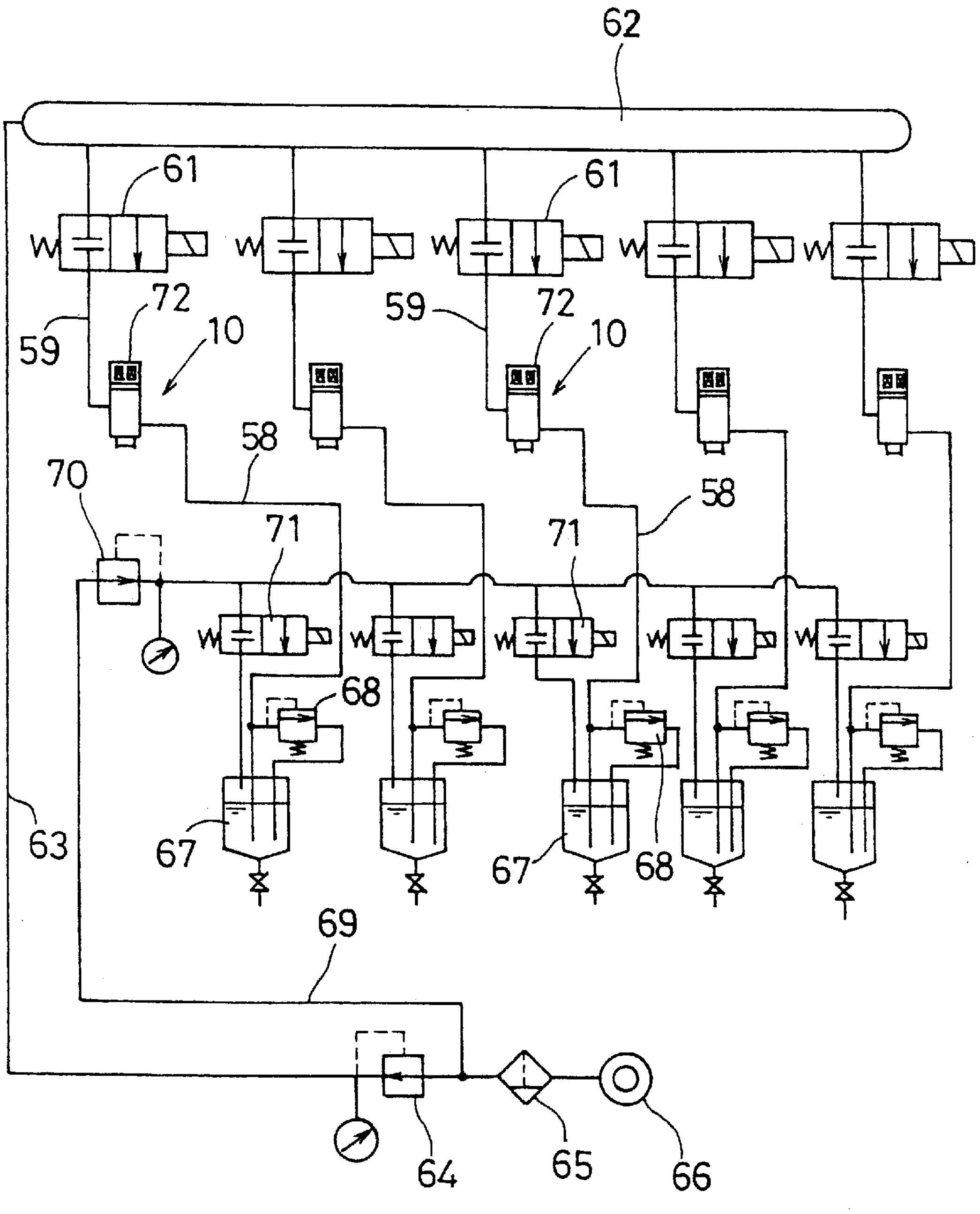
FIG. 19 is a system diagram illustrating an air and paint piping system in the coating apparatus.

FIG. 19 is a system diagram of an air and paint piping system for the coating apparatus 40. The air hose 59 of each coating nozzle 10 is connected to a supply manifold 62 concurrently serves as an air tank common to all the coating nozzles 10 via a normally closed two port air solenoid valve 61. The supply manifold 62 is connected to a pressure-controlled air source 66 via a pipe 63, a pressure control valve 64 and a filter 65. The distal end of the paint hose 58 of each coating nozzle 10 opens into paint contained in a closed paint tank 67, and a pressure relief valve 68 is provided in midcourse of the paint hose 58. On the other hand, a branch pipe 69 from the pressure-controlled air source 66 opens into the closed paint tank 67 via pressure control valve 70 and a normally closed two port air solenoid valve 71.

In the piping system as described above, by opening the normally closed two port air solenoid valves 61, 71 by means of a control system (not shown), the paint is jetted from the paint jetting orifice 11 of the coating nozzle 10 in the form of a regulated jet at a prescribed pressure, and in parallel therewith, air is jetted from the air-jet orifices 23 at a prescribed pressure along vicinities of both ends of the jetted paint membrane 20. In consequence, the end portions of the jetted paint membrane are atomized into minute particles, and thus the resulting linear coating pattern has gradated end portions, as described above. In FIG. 19, reference number 72 represents a solenoid for operating the poppet bar 15 of each of the coating nozzles 10.

Figure 20:
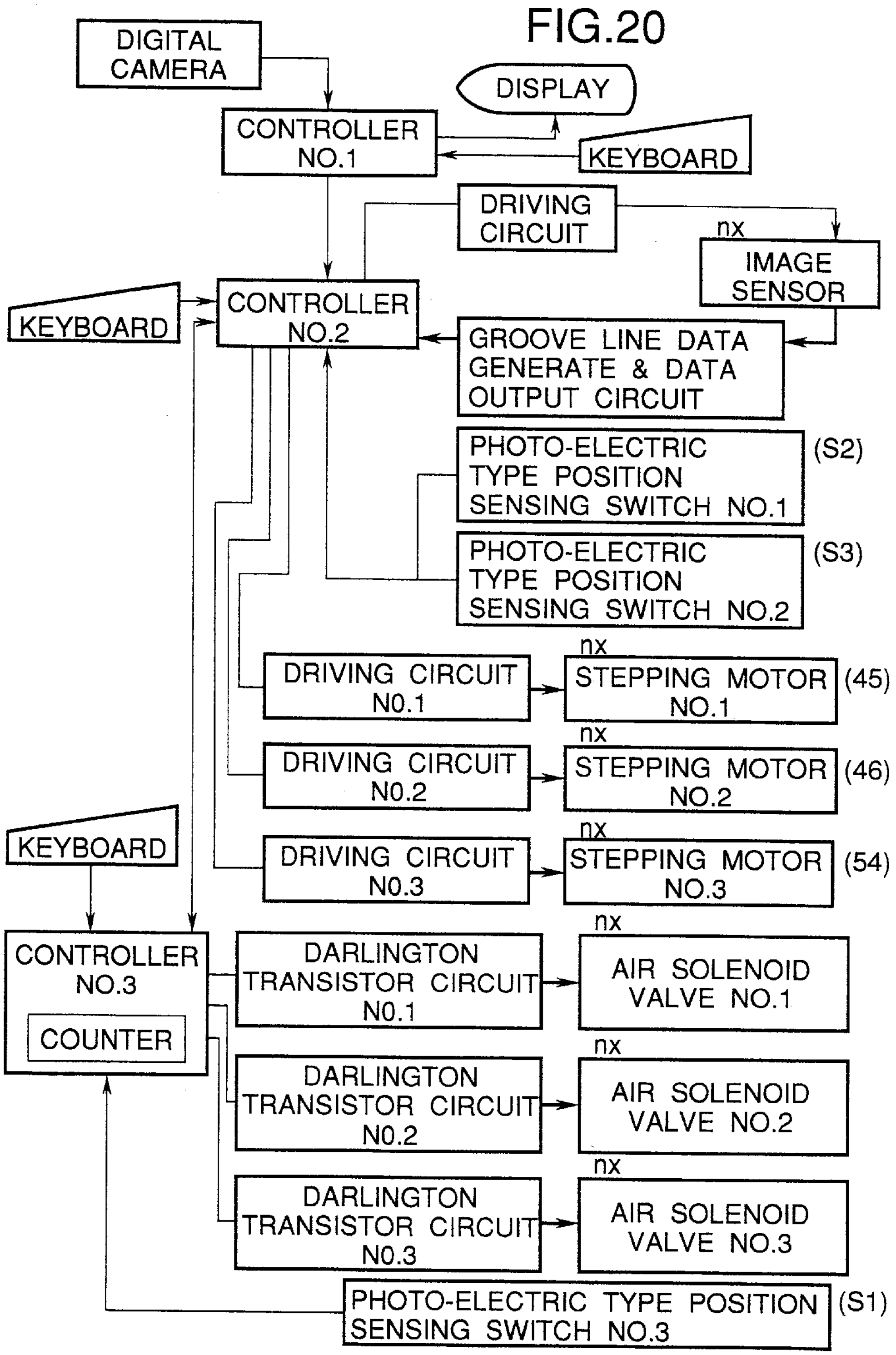
FIG. 20 is a block diagram generally showing the control system of the coating system according to the present invention.
Figure 21:
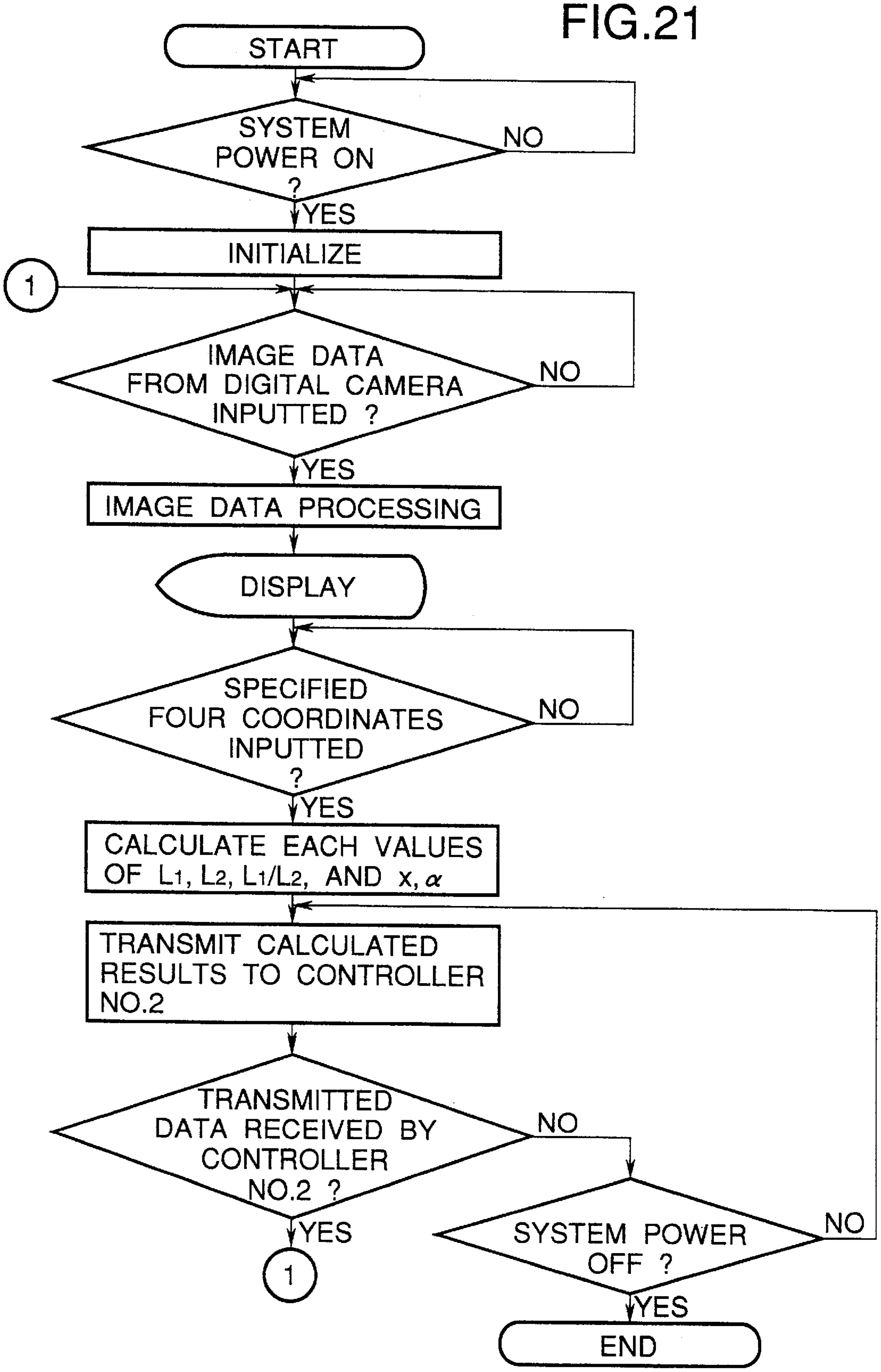
FIG. 21 is a flow chart of control in a controller No. 1.
Figure 22:
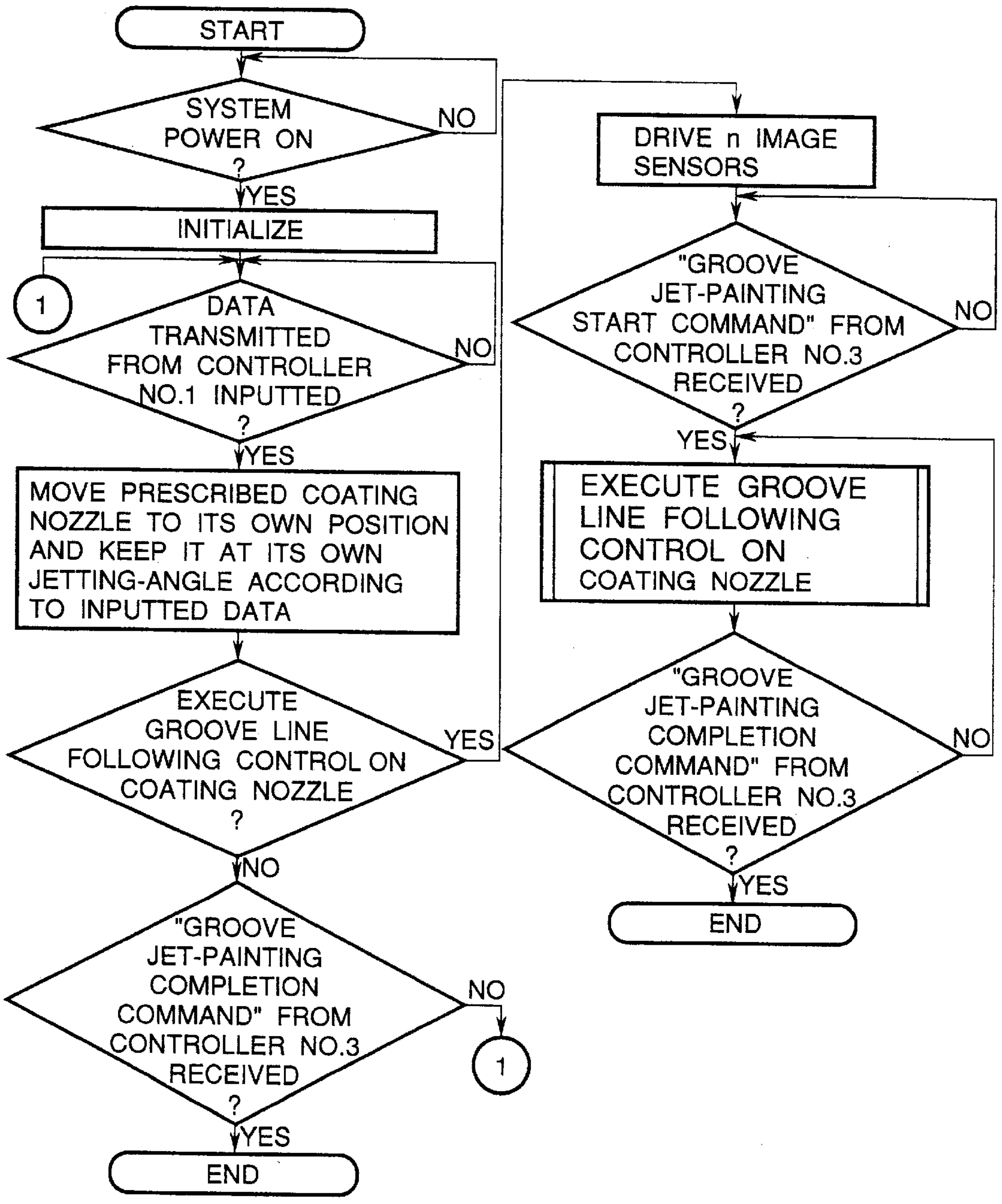
FIG. 22 is a flow chart of control in a controller No. 2.

Operation of the above-described coating apparatus will be described. FIG. 20 is a block diagram generally showing the control system of the coating system, FIG. 21 is a flow chart of control in a controller No. 1, and FIG. 22 is a flow chart of control in a controller No. 2. When image data on a cross-sectional geometry in crosswise direction of a groove from a digital camera as an example of the image pick-up means is shown on a display and coordinates of the above-described four points (A–D) determining the cross-section in crosswise direction of the groove are specified by an operator viewing the displayed image, the operator inputs the coordinates of the points (A) to (D) from a keyboard. Based on the inputted values, (L1) and (L2) as parameters representing eye-catching areas when a building board (A) is viewed from right above, and (L1)/(L2) or (L2)/(L1) and (if necessary) a raising distance (x) of a coating nozzle as parameters for determining a position of the coating nozzle, and (if necessary) an inclination angle ($\alpha$) of the coating nozzle as a parameter of a jetting angle are calculated. The results of the calculation are transmitted to the controller No. 2.

Based on the transmitted input data, the controller No. 2 drives the first to third stepping motors 45, 46, 54 to move the coating nozzle 10 to the given position and to tilt the coating nozzle 10 at the given angle, and keeps the coating nozzle in this condition until the next data is inputted. In this coating system, groove line following control is carried out in order to continuously or successively apply an appropriate coating to a groove of a curved or zigzag line or a groove of a continuous or discontinuous line.

Figure 23:
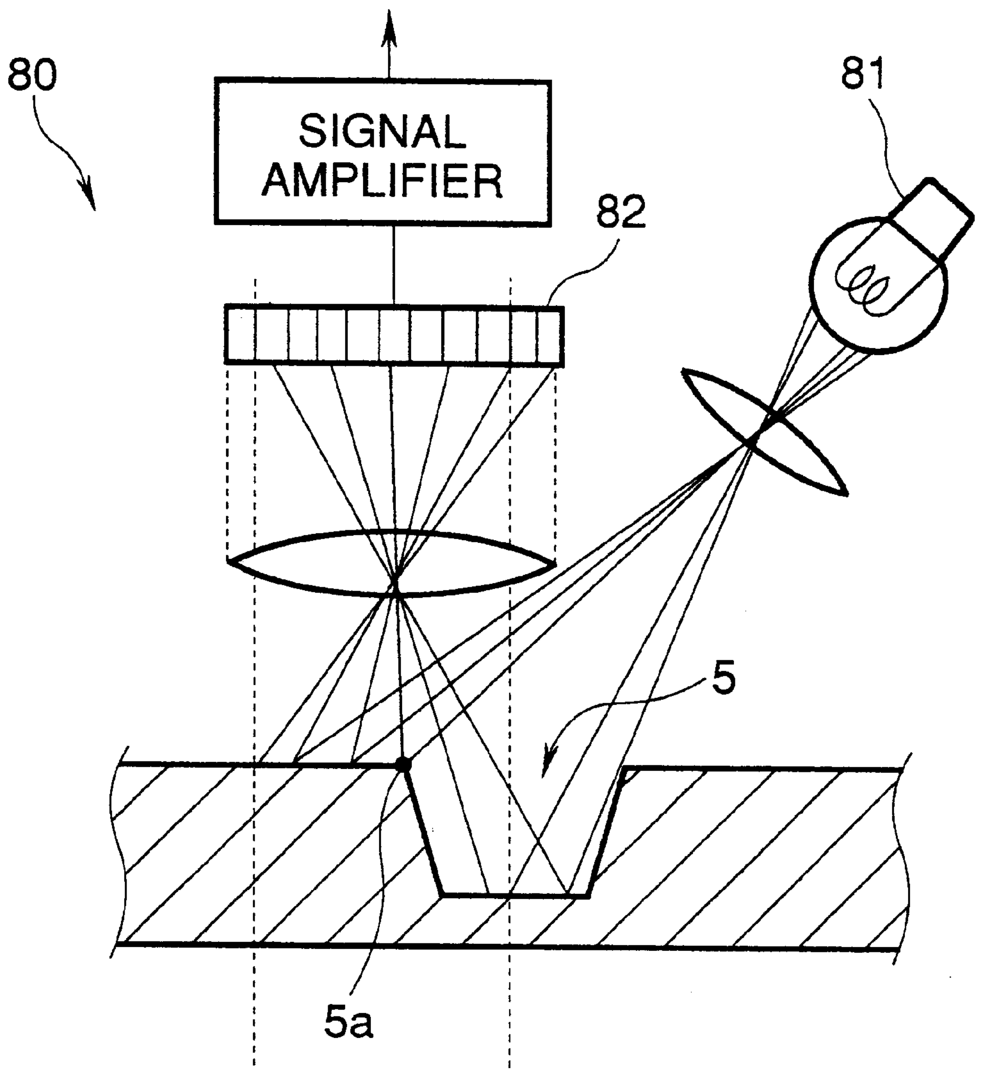
FIG. 23 shows a mode of detection of an edge of a groove as a concavity by means of an image sensor unit mounted on a carriage.

FIG. 23 shows one mode of detection of an edge 5*a* of a groove 5 as a concavity formed in a surface of a building board (A) by means of an image sensor unit 80. Light emitted from an illumination lamp 81 is reflected by the groove 5 and its vicinities, and the reflected light is caught by a linear photodiode array 82. A pulse train (video signals) is thereby obtained which comprises pulses having heights proportional to luminous intensities of light received by the elements of the array. As shown in FIG. 23, light beams reflected from a convexity and light beams reflected from a slope and a bottom have different luminous intensities, and the difference between the luminous intensities appears as difference in pulse height. Accordingly, the groove edge 5*a* can be determined by detecting an inflection point in the pulse train. The sensor unit 80 is located below the carriage 43 above the groove edge 5*a* and slightly ahead of the paint jetting position of the coating nozzle 10.

Figure 24:
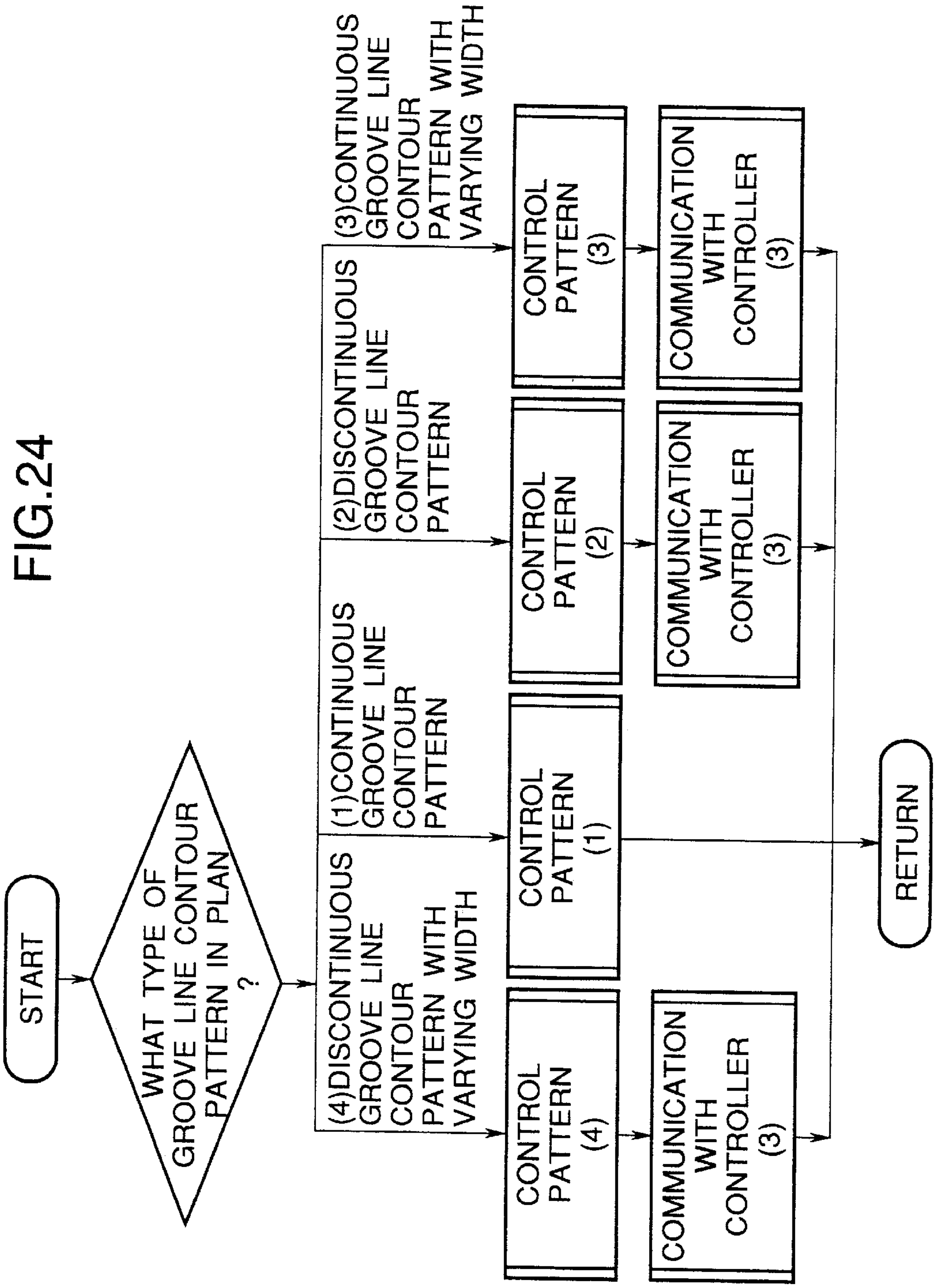
FIG. 24 is a flow chart generally showing one mode of groove line following control.

FIG. 24 is a flow chart generally showing a mode of the groove line following control. In this mode, grooves are classified into four patterns (1) to (4), i.e., (1) continuous groove line contour pattern, (2) discontinuous groove line contour pattern, (3) continuous groove line contour pattern with a varying width, and (4) discontinuous groove line contour pattern with a varying width. To the groove patterns (1) to (4), control patterns (1) to (4) are allotted, respectively.

Figure 25:
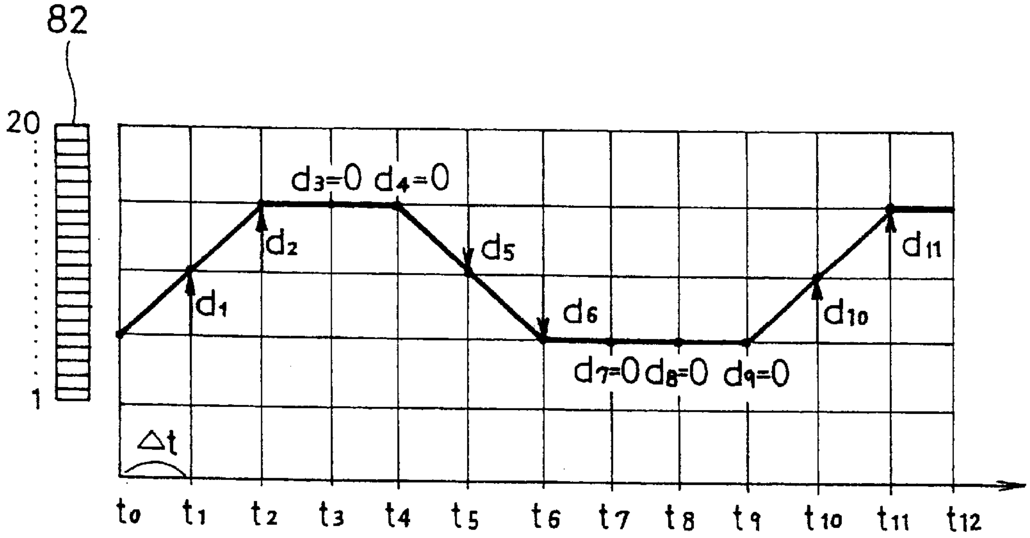
FIG. 25 is an illustrative representation of principle of control to move the coating apparatus in accordance with groove line data.

The principle of the control to move a carriage 43 in accordance with the obtained groove line data is as follows. As shown in FIG. 25, numbers (for example, 1 to 20) are assigned to the elements of the linear photodiode array 82. Assuming that a pitch of the elements is (p), that a sampling time for detecting an groove edge is ($\Delta t$), and that a number of an element corresponding to a groove edge (nA'), a vector (di) of movement in a time period of ($\Delta t$) is expressed by di=p(nA−nA'). In other words, the vector (di) is obtained as information on the direction and amount of the movement. The information is digitalized into the groove line data. Based on the groove line data on a groove edge present slightly ahead of the position of the coating nozzle 10, rotations of the stepping motors are controlled in relation to the direction and amount (amount proportional to a number of pulses generated) of the movement of the carriage 43 to perform an intended control. In this connection, when rate of change of the groove line data is relatively large, a microstep driving mode as a circuit technique may be used to further finely control a basic step angle (rotation angle of a rotating shaft of the motor responsive to one inputted pulse).

Figure 26:
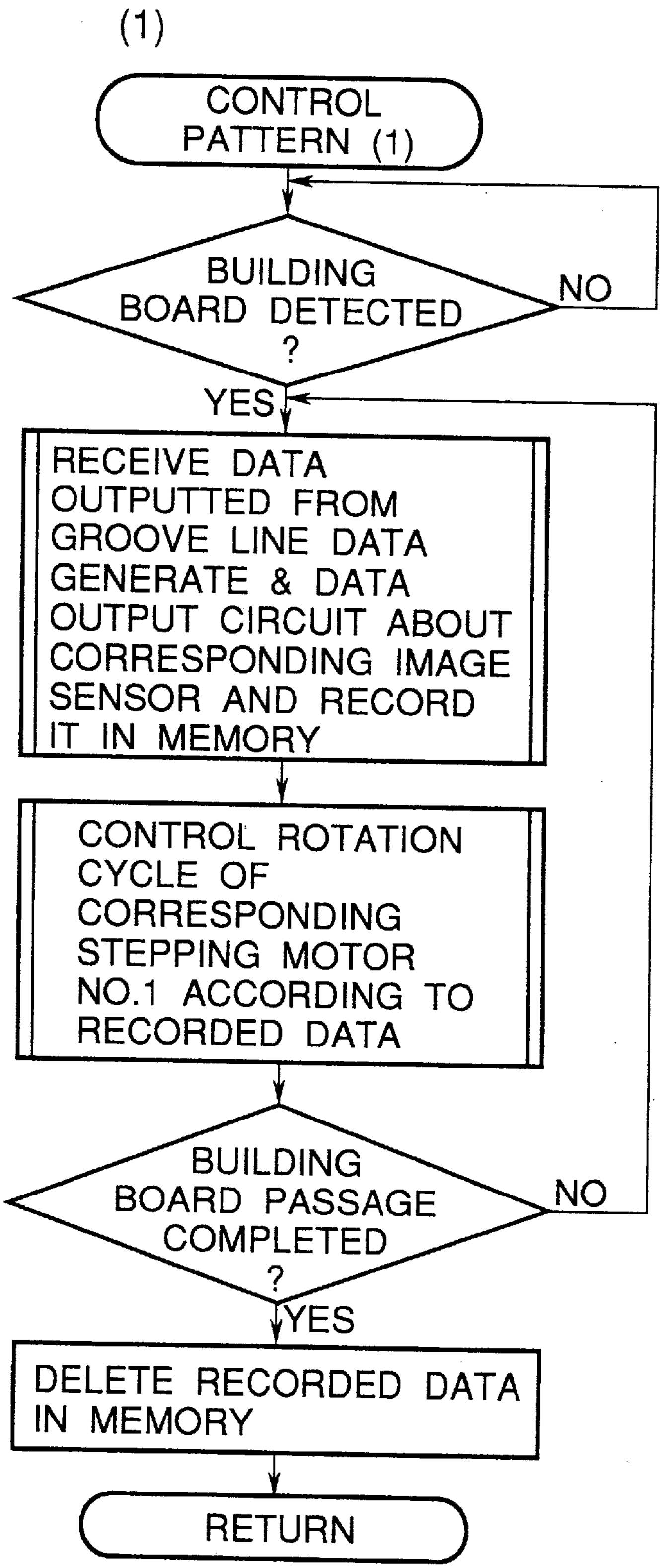
FIG. 26 is a flow chart of a control pattern allotted to the groove line following pattern (1) (continuous groove pattern).
Figure 27:
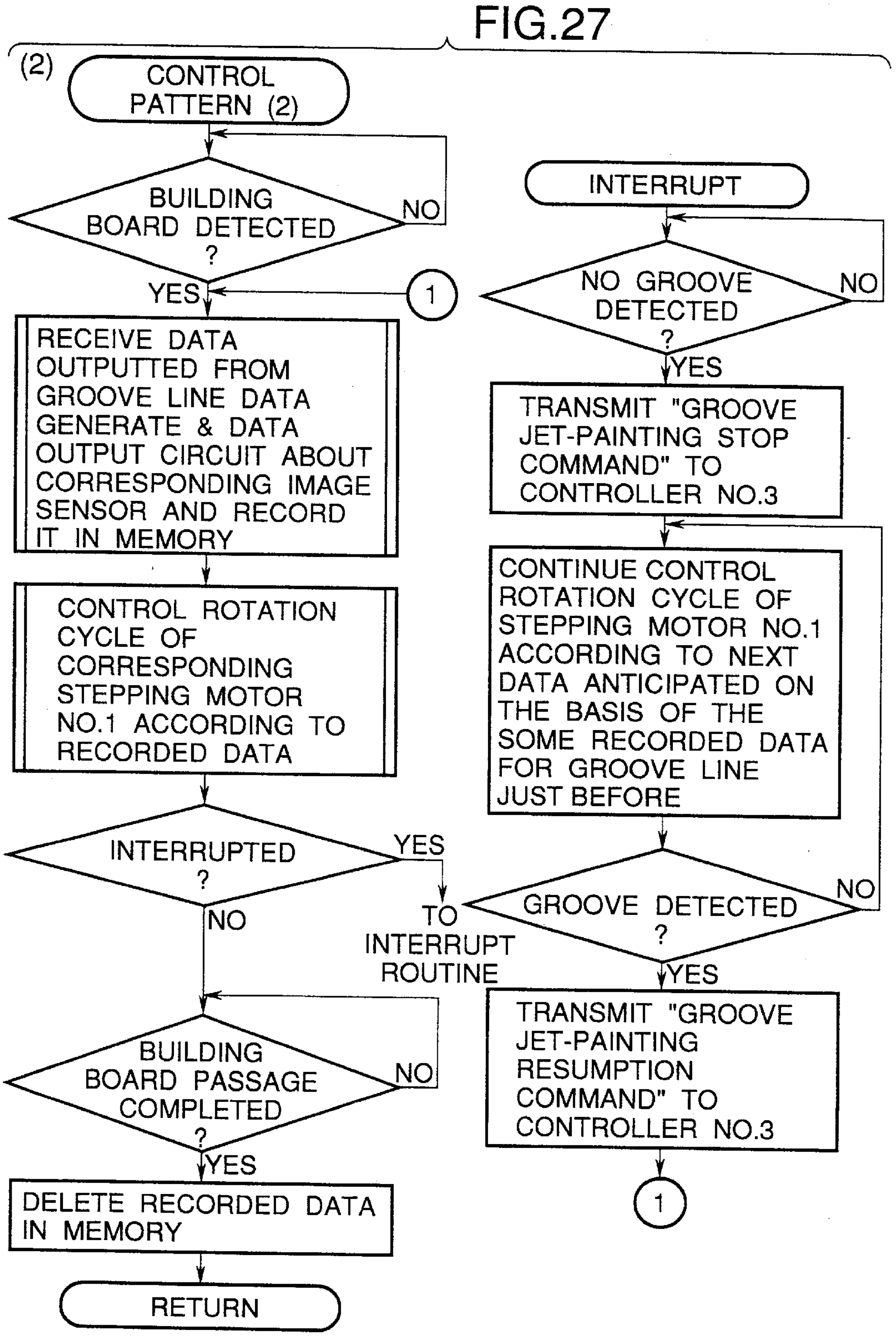
FIG. 27 is a flow chart of a control pattern allotted to the groove line following pattern (2) (discontinuous groove pattern).

FIG. 26 is a flow chart of the control pattern (1) allotted to the groove line following pattern (1) (continuous groove line contour pattern) as shown in FIG. 24. In this case, an intended control can be effected by controlling only rotation of the first stepping motor 45 [stepping motor No. 1] on the carriage 43. FIG. 27 is a flow chart of the control pattern (2) allotted to the groove line following pattern (2) (discontinuous groove line contour pattern). In this case, paint is not jetted to discontinuous portions. Accordingly, when no groove is detected in the course of rotation control of the first stepping motor 45 [stepping motor No. 1] on the carriage 43, interrupt routine runs to send a jetting suspension signal (jetting stop signal) to a controller (3) which will be described below. The rotation control of the first stepping motor 45 is continued in accordance with the next data expected from the inputted data record, and when the subsequent groove portion is detected, a jetting resumption signal is sent to the controller (3). By virtue of this, a coating can smoothly be applied to a discontinuous groove.

Figure 28:
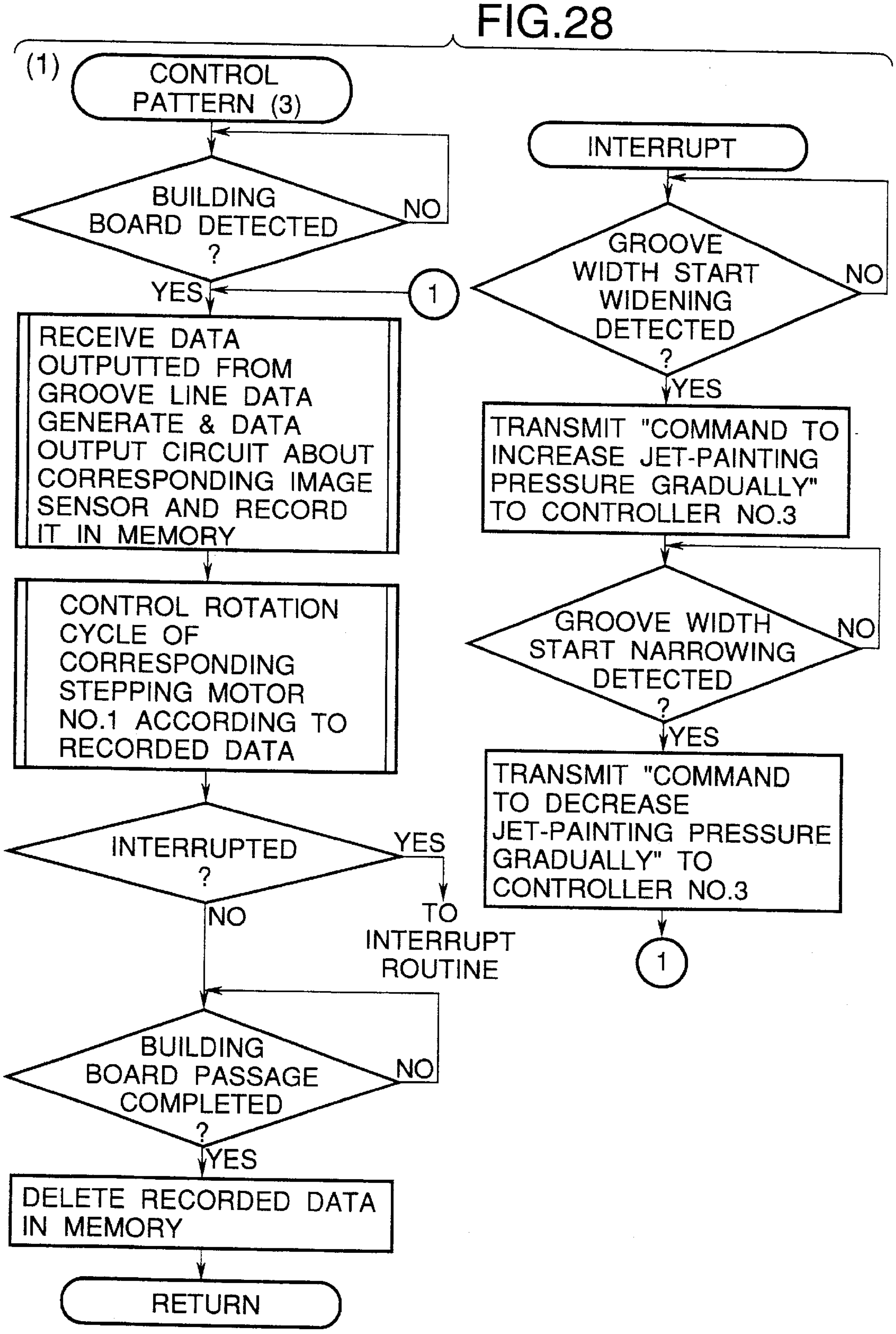
FIG. 28 is a flow chart of a control pattern allotted to the groove line following pattern (3) (continuous groove pattern with a varying groove width).
Figure 29:
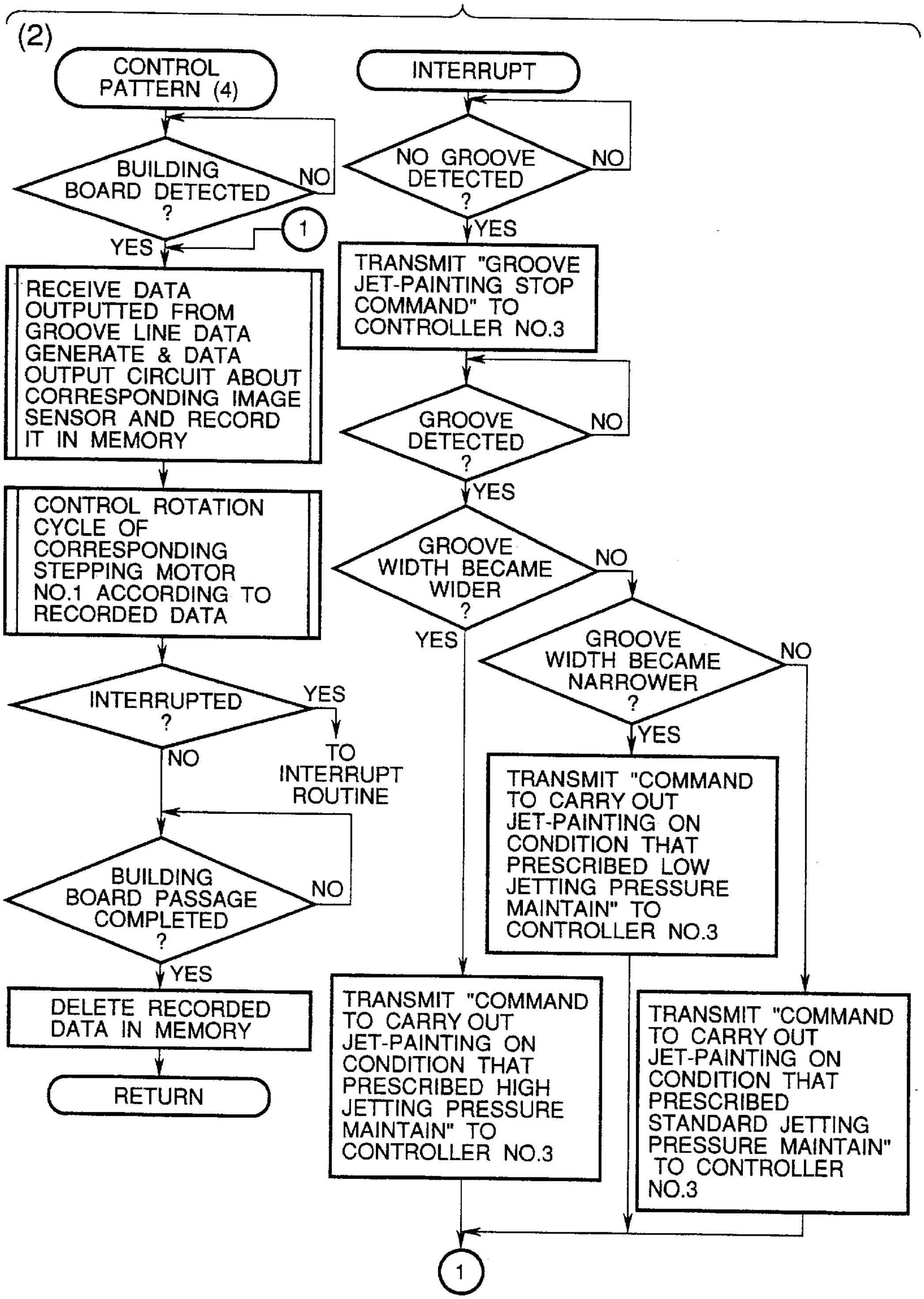
FIG. 29 is a flow chart of a control pattern allotted to the groove line following pattern (4) (discontinuous groove pattern with a varying groove width).

FIG. 28 is a flow chart of the control pattern (3) allotted to the groove line following pattern (3) (continuous groove line contour pattern with a varying width). In this case, change in the groove width is detected by comparison with the preceding groove line data, interrupt routine runs. For example, when it is detected that the groove width becomes greater, commands are sent to the controller (3) that paint jetting pressure is to be gradually increased, thereby surely obtaining a coating width corresponding to the groove width. On the other hand, when it is detected that the groove width becomes narrower, commands are sent to the controller (3) that paint jetting pressure is to be gradually reduced, thereby preventing paint from being applied also to a convexity. FIG. 29 is a flow chart of the control pattern (4) allotted to the groove line following pattern (4) (discontinuous groove line contour pattern with a varying width). In this case, control is effected by combination of the flow of the control pattern (2) allotted to the discontinuous groove line contour pattern and the flow of the control pattern (3) allotted to the continuous groove line contour pattern with a varying width.

When the paint jetting pressure is controlled as described above, instead of the paint supply mode under pressure by means of a pressurized air as shown in FIG. 19, a pump mode is employed as a supply mode of paint from the paint tank to the coating nozzle under pressure. In other words, the paint jetting pressure is controlled by controlling paint feed rate of the paint supply pump. In this case, an intended control is effected by inverter-controlling number of revolutions of an AC servo-motor driving the pump.

Figure 30:
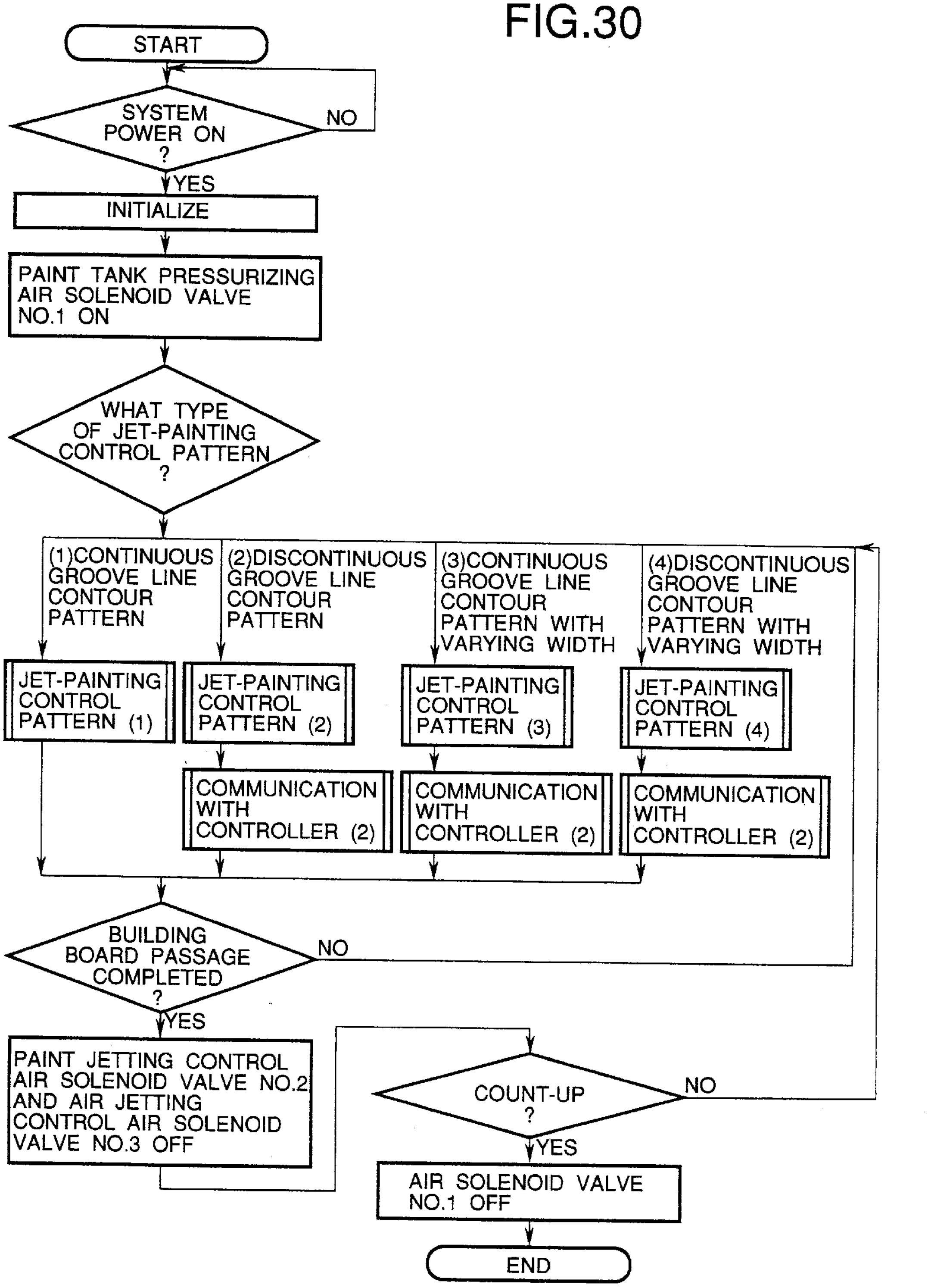
FIG. 30 is a flow chart of control in a controller No. 3.
Figure 31:
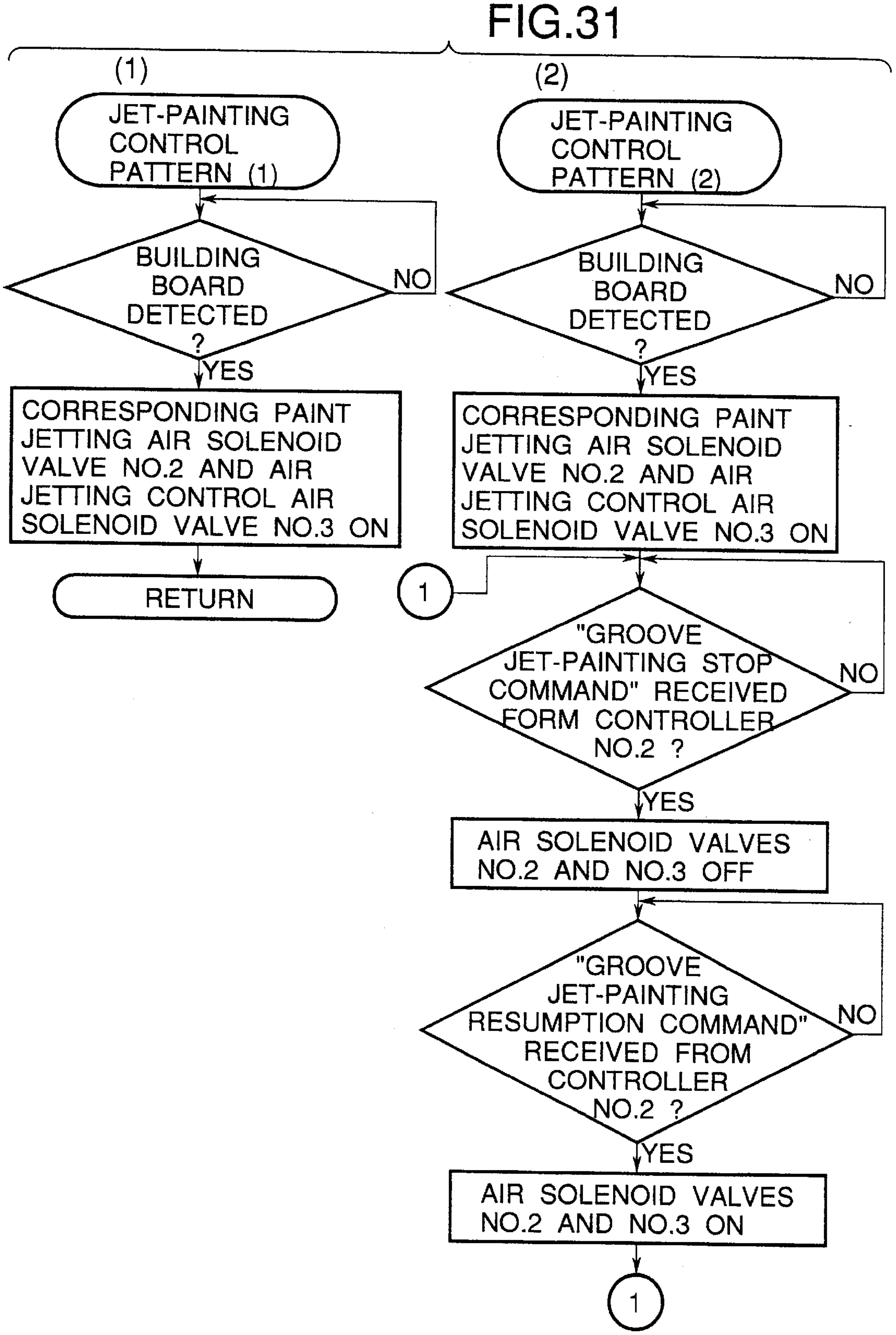
FIG. 31(1) is a flow chart of jet-painting control pattern (1) corresponding to a continuous groove, and FIG. 31(2) is a flow chart of jet-painting control pattern (2) corresponding to a discontinuous groove.

FIG. 30 is a flow chart of the control in the controller (3) in FIG. 20. An air solenoid valve No. 1 for operating a pressurized air source 66 is actuated, and then a groove line pattern is recognized from the groove line data obtained by the image sensor as one of the groove line patterns (1) to (4) and control is carried out in accordance with the corresponding one of the paint jetting control patterns (1) to (4). Specifically, as shown in FIG. 31(1), the jet-painting control pattern (1) corresponds to the groove line pattern (1) of a continuous groove, and an air solenoid valve No. 2 for paint jetting and an air solenoid valve No. 3 for air jetting are turned on. In other words, both of the air solenoid valve No. 2, i.e. the normally closed two port air solenoid valve 71 in the branch pipe 69 and the air solenoid valve No. 3, i.e. the normally closed two port air solenoid valve 61 in the air hose 59 are turned on to initiate coating.

As shown in FIG. 31(2), the jet-painting control pattern (2) corresponds to the groove line pattern (2) of a discontinuous groove. The air solenoid value No. 2 for paint jetting and the air solenoid value No. 3 for air jetting are turned on to initiate coating. Thereafter, when jetting suspension (stop) commands from the controller No. 2 are received, the air solenoid values No. 2 and No. 3 and are turned off to suspend the coating. When jetting resumption commands are received, the air solenoid values No. 2 and No. 3 are again turned on.

Figure 32:
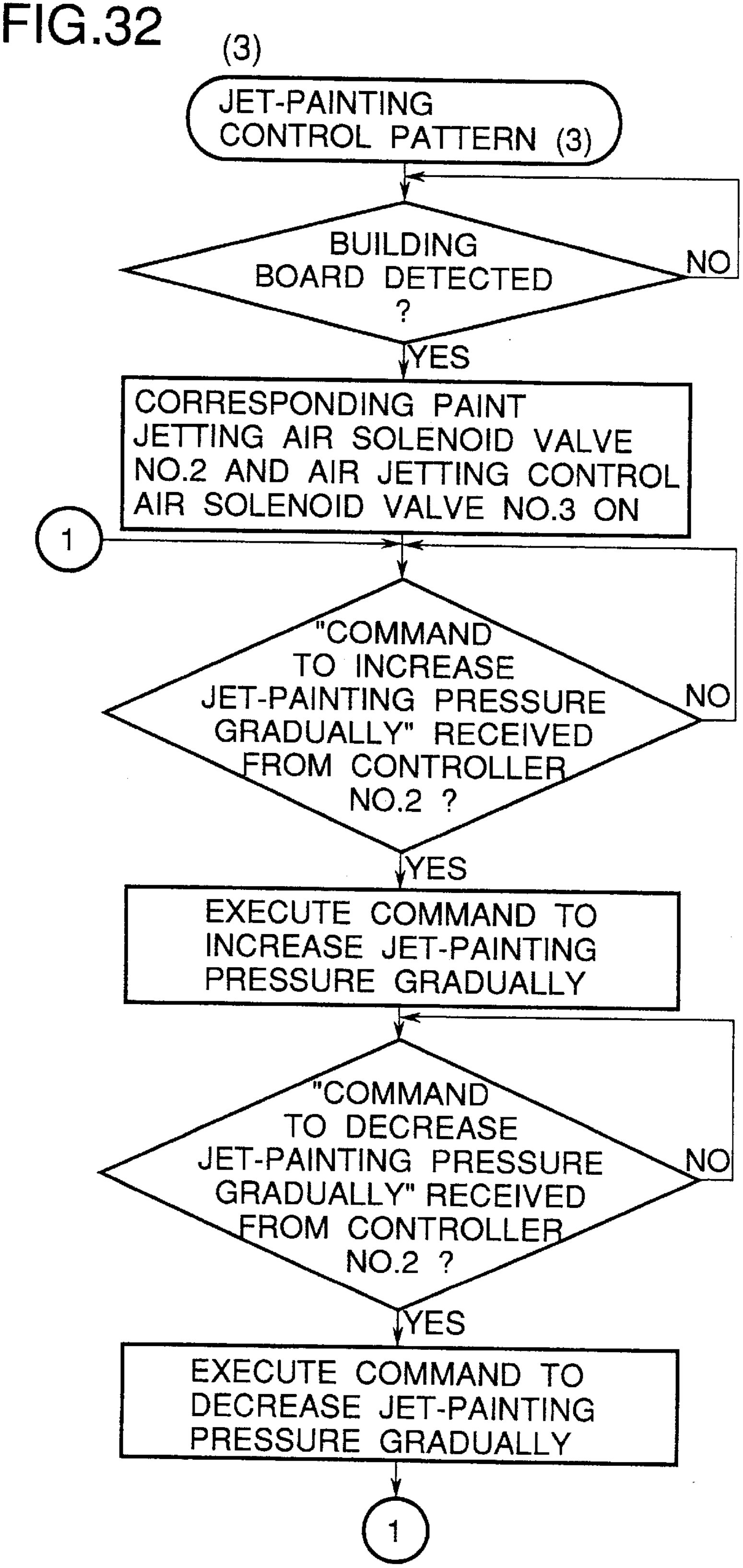
FIG. 32 is a flow chart of jet-painting control pattern (3) corresponding to a continuous groove with a varying groove width.
Figure 33:
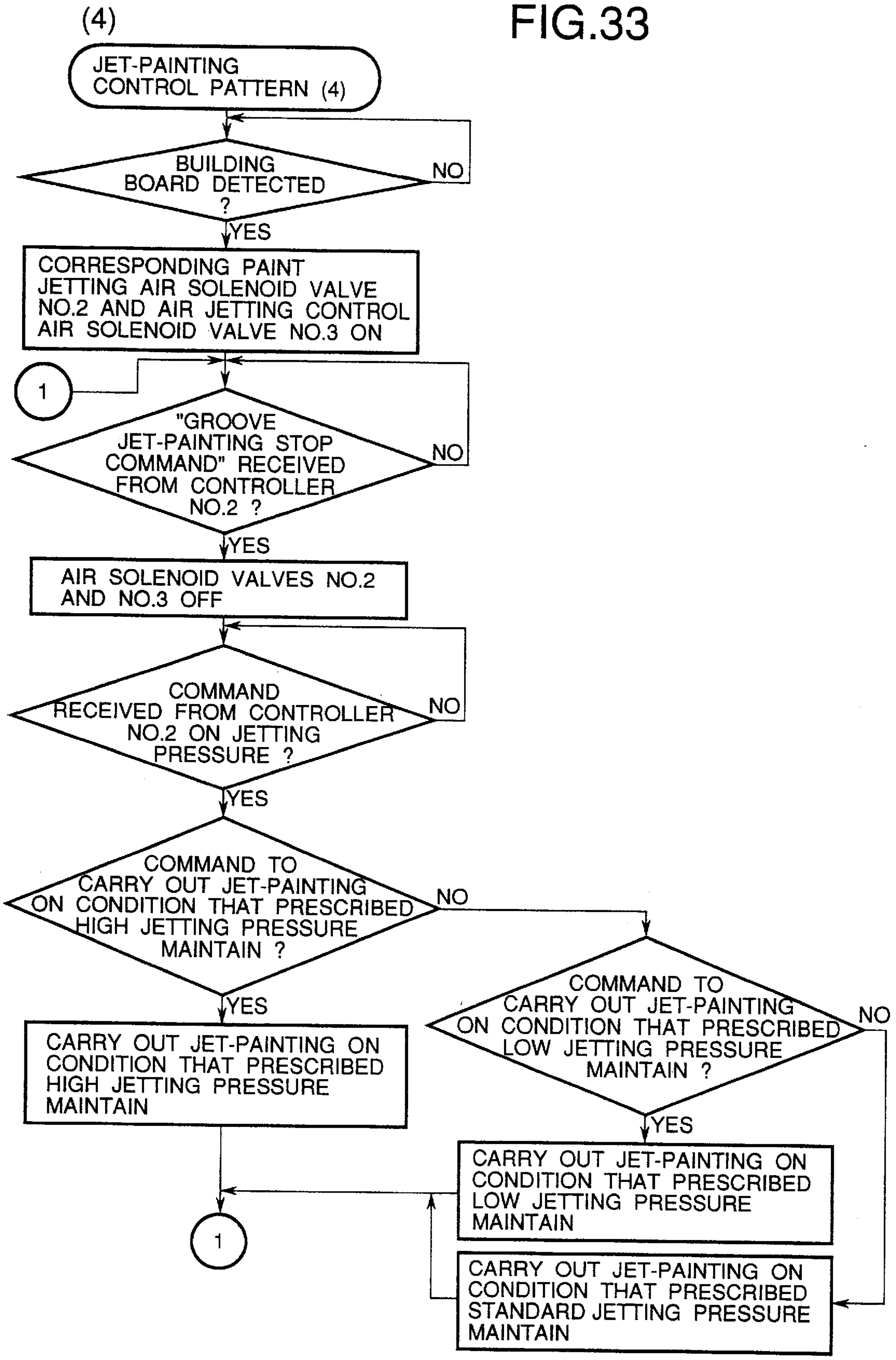
FIG. 33 is a flow chart of jet-painting control pattern (4) corresponding to a discontinuous groove with a varying groove width.

As shown in FIG. 32, the jet-painting control pattern (3) corresponds to the groove line pattern (3) of a continuous groove with a varying groove width. The air solenoid value No. 2 for paint jetting and the air solenoid value No. 3 for air jetting are turned on to initiate coating. Thereafter, when commands from the controller (2) are received that paint jetting pressure is to be gradually increased or that paint jetting pressure is to be gradually reduced, the commands are put into effect by controlling number of revolutions of a motor of a paint supply pump. FIG. 33 shows the jet-painting control pattern (4) corresponding to the groove line pattern (4) of a discontinuous groove with a varying groove width. In this case, control is carried out by combination of the jet-painting control pattern (2) of a discontinuous groove line contour pattern and the jet-painting control pattern (3) of a continuous groove line contour pattern with a varying width.

Figure 35:
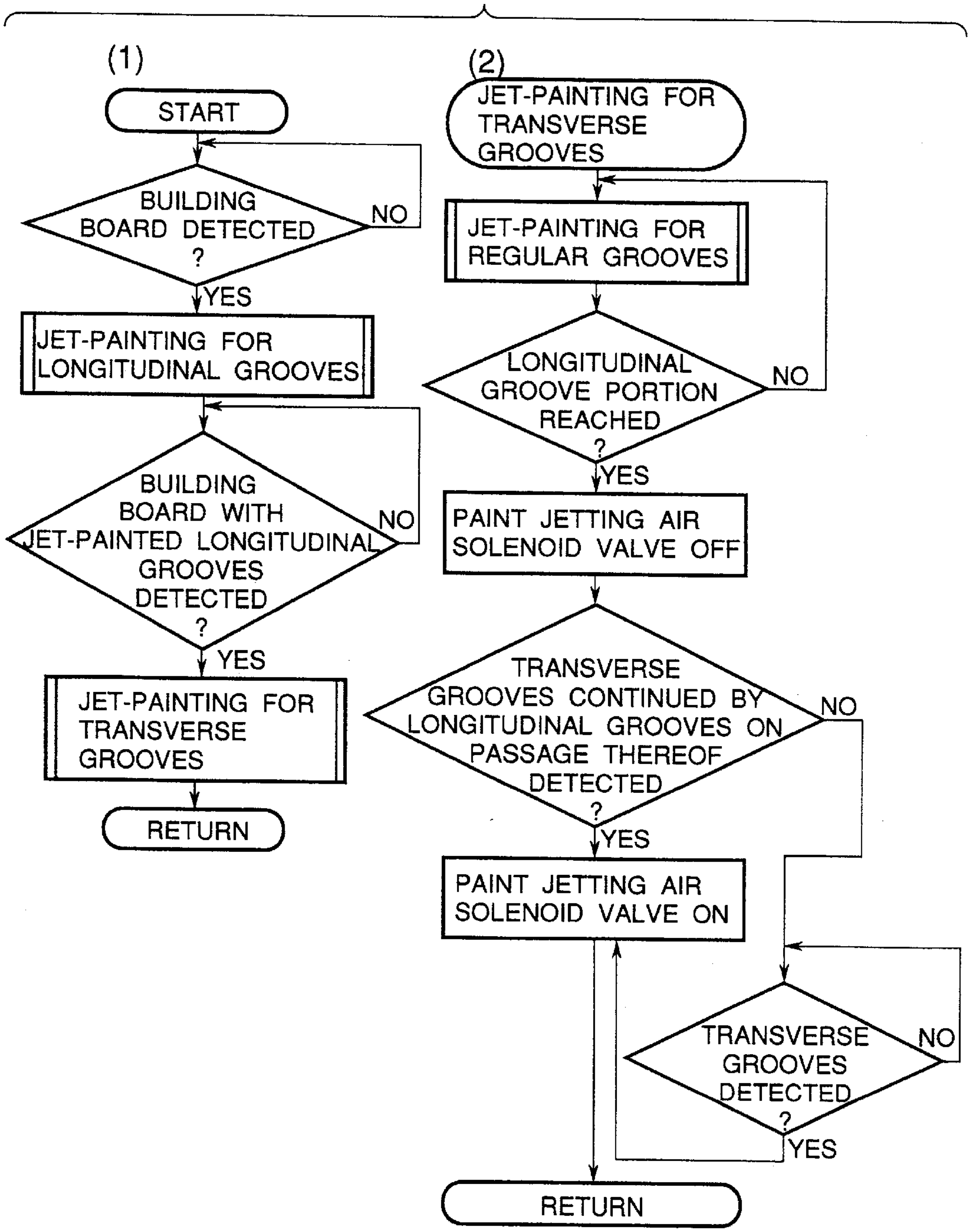
FIG. 35 is a flow chart of control in the system shown in FIG. 34(*a*).

It will be understood that a building board having its concavities coated in a manner as shown in FIGS. 1 and 2 can be obtained by operating the above-described coating nozzle 10 and the coating apparatus 40 equipped therewith in accordance with the above-described flow of control. However, the flow of control is not straightly applicable to grooves running in the direction perpendicular to the direction of transfer of a building board, although it is capable of applying a coating to grooves as concavities running in the direction of transfer of a building board, as desired. In view of this, explanation will be given hereinbelow on application of a coating to a building board (A) as illustrated in FIG. 34(B), which is formed with grooves (X) extending in the longitudinal direction and grooves (Y) extending in the transverse direction, by means of a system according to the present invention. FIG. 34(A) is a plan view illustrating a manner of the application. FIG. 35 is a flow chart of control in the system. In this system, a first coating apparatus 40A according to the present invention is placed in the direction perpendicular to that of transfer of a building board (A) transferred by a first conveyor 31A to thereby carry out application of a coating to the longitudinal grooves (X). On arrival of the coated building board (A) at the end of the first conveyor 31A, the building board (A) is delivered to a second conveyor 31B placed perpendicularly to the first conveyor 31A and thus transferred at right angles to the previous transfer direction. Above the second conveyor 31B, a second coating apparatus 40B is located. By means of the second coating apparatus 40B, application of a coating to the transverse grooves (Y) is carried out. In this connection, since the longitudinal grooves (X) has already been coated, the latter application is so controlled as to prevent overlapping application of coatings to intersection points of the grooves. The building board subjected to the latter application is further transferred by the conveyor 31B and discharged from the system. The procedure may be repeated according to need, thereby enabling application of an intended coating pattern to grooves having more complicated patterns to be realized.

Figure 36:
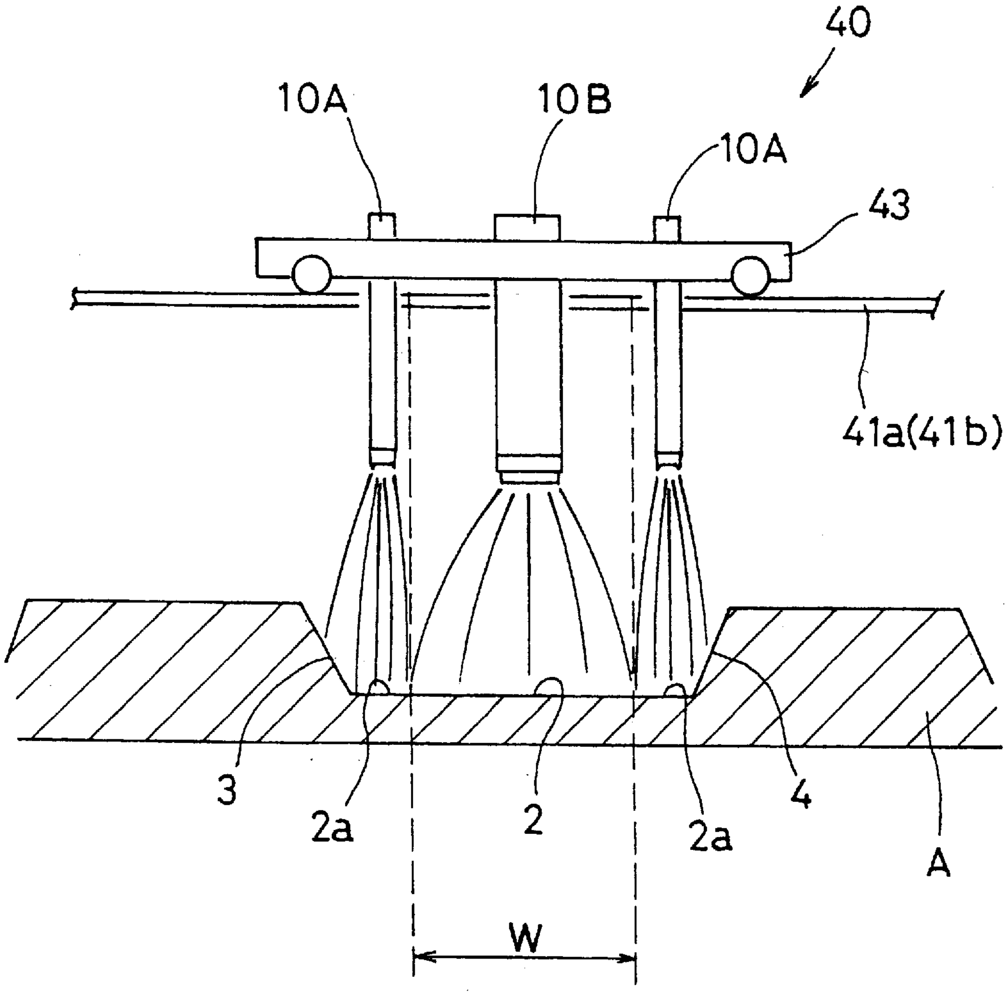
FIG. 36 is an illustrative view of an embodiment of the coating apparatus preferably used for coating a concavity having a wide bottom.
Figure 37:
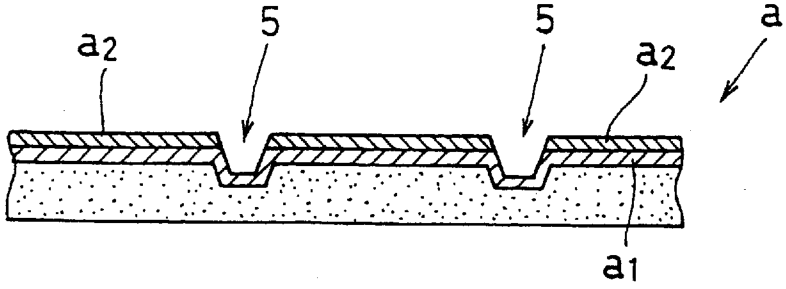
FIG. 37 is a partial sectional view illustrating a building board coated by a conventional method.

In the following, a case will be described where a concavity having such a cross-sectional geometry in crosswise direction that a coating by means only of a single coating nozzle as described with reference to FIG. 8 cannot cover its bottom width. FIG. 36 shows one embodiment of the coating apparatus 40 used in such a case, which comprises three coating nozzles. Of these, a center coating nozzle 10B is substantially the same as the coating nozzle 10 shown in FIG. 8 except that the right and left air-jet orifices 23, 23 are not provided or supply no air jet during operation, and each of right and left coating nozzles 10A, 10A is substantially the same as the coating nozzle shown in FIG. 8 except that one of the right and left air-jet orifices 23, 23 (i.e., the air-jet orifice proximate to the coating nozzle 10B) is not provided or supplies no air jet during operation. A majority (major portion with a width W) of a bottom 2 of a concavity is coated by the center coating nozzle 10B, and side portions 2*a*, 2*a* of the bottom and side walls 3, 4 are coated by the right and left coating nozzles 10A, 10A. In this case, it will easily be understood that by controlling paint jetting positions and jetting angles of the right and left coating nozzles 10A, 10A in substantially the same manner as described above, a coating which is substantially the same as that described with reference to FIGS. 1 and 2 can be applied to the right and left side walls 3, 4.

As described above, according to the present invention, a building board having an aesthetically enhanced surface can be obtained which has not been obtained by conventional coating methods. In particular, not only to rectilinear concavities but also to complicated curved concavities with varying cross-sectional geometries in crosswise direction which are formed in a surface of a building board, a coating that gives strong impression of shading to a viewer can be applied. It is thereby possible to obtain a building board having its surface aesthetically enhanced.

What is claimed is:

1. A building board comprising:

a surface provided with a concavity having a bottom, a right side and a left side, wherein only the concavity is coated such that a color of the coating is deepest in said bottom and gradually becomes lighter along said right and left sides from said bottom to the surface.

2. A building board comprising:

a surface provided with a concavity having a bottom, a right side and a left side, wherein only the concavity is coated;

said right and left sides being coated such that an average color depth of the coating in a side having a larger horizontal component is lighter than the average color depth in the side having a smaller horizontal component.

3. The building board of claim 2, wherein said concavity is coated such that a color of the coating is deepest in said bottom and gradually becomes lighter along said right and left sides from said bottom to the surface.

4. The building board of claim 1 or 2, wherein said concavity is a linear or curved groove.

5. The building board of claim 1 or 2, wherein a spatter coating is provided all over the surface, and the spatter coating is applied to said concavity.

6. A building board as in claim 1, wherein the concavity is a generally longitudinally extending groove portion formed in the surface, the groove portion having the bottom, the right side and the left side which extend together in a certain length.

7. A building board as in claim 2, wherein the concavity is a generally longitudinally extending groove portion formed in the surface, the groove portion having the bottom, the right side and the left side which extend together in a certain length.

* * * * *